April 6, 1965 R. K. SEDGWICK 3,176,847

TOOL IDENTIFICATION SYSTEM

Filed July 20, 1962 9 Sheets-Sheet 1

INVENTOR.

Robert K. Sedgwick

BY Cyril M. Hajewski

Attorney

TOOL IDENTIFICATION SYSTEM

Filed July 20, 1962 9 Sheets-Sheet 2

INVENTOR.
Robert K. Sedgwick
BY Cyril M. Hajewski
Attorney

April 6, 1965 R. K. SEDGWICK 3,176,847

TOOL IDENTIFICATION SYSTEM

Filed July 20, 1962 9 Sheets-Sheet 3

INVENTOR.
Robert K. Sedgwick
BY Cyril M. Hajewski
Attorney

| BIT POSITIONS & SWITCH PAIRS \ IDENTIFIER CONFIGURATION | 0 | 1 | 2 | 3 |
|---|---|---|---|---|
| A | 0 | 1 | 2 | 1<br>2<br>3 |
| B | 0 | 4 | 8 | 4<br>8<br>12 |
| C | 0 | 16 | 32 | 16<br>32<br>48 |
| D | 0 | 64 | 128 | 64<br>128<br>192 |
| E | 0 | 256 | 512 | 256<br>512<br>768 |
| F | 0 | 1,024 | 2,048 | 1024<br>2048<br>3072 |
| G | 0 | 4,096 | 8,192 | 4,096<br>8192<br>12,288 |
| H | 0 | 16,384 | 32,768 | 16,384<br>32,768<br>49,152 |
| I | 0 | 65,536 | 131,072 | 65,536<br>131,072<br>196,608 |
| J | 0 | 262,144 | 524,288 | 262,144<br>524,288<br>786,432 |

BINARY SWITCH VALUES

INVENTOR.
Robert K. Sedgwick
BY Cyril M. Hajewski
Attorney

| TOOL NUMBER | BIT POSITIONS | | | | | | | | | |
|---|---|---|---|---|---|---|---|---|---|---|
| | J | I | H | G | F | E | D | C | B | A |
| | QUATERNARY TOOL CODING | | | | | | | | | |
| 1 | 0 | 0 | 0 | 0 | 0 | 0 | 0 | 0 | 0 | 1 |
| 2 | 0 | 0 | 0 | 0 | 0 | 0 | 0 | 0 | 0 | 2 |
| 3 | 0 | 0 | 0 | 0 | 0 | 0 | 0 | 0 | 0 | 3 |
| 4 | 0 | 0 | 0 | 0 | 0 | 0 | 0 | 0 | 1 | 0 |
| 5 | 0 | 0 | 0 | 0 | 0 | 0 | 0 | 0 | 1 | 1 |
| 6 | 0 | 0 | 0 | 0 | 0 | 0 | 0 | 0 | 1 | 2 |
| 7 | 0 | 0 | 0 | 0 | 0 | 0 | 0 | 0 | 1 | 3 |
| 8 | 0 | 0 | 0 | 0 | 0 | 0 | 0 | 0 | 2 | 0 |
| 9 | 0 | 0 | 0 | 0 | 0 | 0 | 0 | 0 | 2 | 1 |
| 10 | 0 | 0 | 0 | 0 | 0 | 0 | 0 | 0 | 2 | 2 |
| 11 | 0 | 0 | 0 | 0 | 0 | 0 | 0 | 0 | 2 | 3 |
| 12 | 0 | 0 | 0 | 0 | 0 | 0 | 0 | 0 | 3 | 0 |
| 13 | 0 | 0 | 0 | 0 | 0 | 0 | 0 | 0 | 3 | 1 |
| 14 | 0 | 0 | 0 | 0 | 0 | 0 | 0 | 0 | 3 | 2 |
| 15 | 0 | 0 | 0 | 0 | 0 | 0 | 0 | 0 | 3 | 3 |
| 16 | 0 | 0 | 0 | 0 | 0 | 0 | 0 | 1 | 0 | 0 |
| 17 | 0 | 0 | 0 | 0 | 0 | 0 | 0 | 1 | 0 | 1 |
| 18 | 0 | 0 | 0 | 0 | 0 | 0 | 0 | 1 | 0 | 2 |
| 19 | 0 | 0 | 0 | 0 | 0 | 0 | 0 | 1 | 0 | 3 |
| 20 | 0 | 0 | 0 | 0 | 0 | 0 | 0 | 1 | 1 | 0 |
| 21 | 0 | 0 | 0 | 0 | 0 | 0 | 0 | 1 | 1 | 1 |
| 22 | 0 | 0 | 0 | 0 | 0 | 0 | 0 | 1 | 1 | 2 |
| 23 | 0 | 0 | 0 | 0 | 0 | 0 | 0 | 1 | 1 | 3 |
| 24 | 0 | 0 | 0 | 0 | 0 | 0 | 0 | 1 | 2 | 0 |
| 25 | 0 | 0 | 0 | 0 | 0 | 0 | 0 | 1 | 2 | 1 |
| 26 | 0 | 0 | 0 | 0 | 0 | 0 | 0 | 1 | 2 | 2 |
| 27 | 0 | 0 | 0 | 0 | 0 | 0 | 0 | 1 | 2 | 3 |
| 28 | 0 | 0 | 0 | 0 | 0 | 0 | 0 | 1 | 3 | 0 |
| 29 | 0 | 0 | 0 | 0 | 0 | 0 | 0 | 1 | 3 | 1 |
| 30 | 0 | 0 | 0 | 0 | 0 | 0 | 0 | 1 | 3 | 2 |
| 31 | 0 | 0 | 0 | 0 | 0 | 0 | 0 | 1 | 3 | 3 |
| 32 | 0 | 0 | 0 | 0 | 0 | 0 | 0 | 2 | 0 | 0 |
| | | | | | | | | | | |
| 1,023 | 0 | 0 | 0 | 0 | 0 | 3 | 3 | 3 | 3 | 3 |
| | | | | | | | | | | |
| 10,703 | 0 | 0 | 0 | 2 | 2 | 1 | 3 | 0 | 3 | 3 |
| | | | | | | | | | | |
| 93,243 | 0 | 1 | 1 | 2 | 3 | 0 | 0 | 3 | 2 | 3 |
| | | | | | | | | | | |
| 263,485 | 1 | 0 | 0 | 0 | 1 | 1 | 0 | 3 | 3 | 1 |
| | | | | | | | | | | |
| 813,673 | 3 | 0 | 1 | 2 | 2 | 2 | 1 | 2 | 2 | 1 |
| | | | | | | | | | | |
| 1,000,001 | 3 | 3 | 1 | 0 | 0 | 2 | 1 | 0 | 0 | 1 |
| | | | | | | | | | | |
| 1,012,131 | 3 | 3 | 1 | 3 | 0 | 1 | 2 | 2 | 0 | 3 |
| | | | | | | | | | | |
| 1,048,575 | 3 | 3 | 3 | 3 | 3 | 3 | 3 | 3 | 3 | 3 |

FIG. 10

INVENTOR.
Robert K. Sedgwick
BY Cyril M. Hajewski
Attorney

FIG. 12

TOOL NO. 1

| POSITIONS | J | I | H | G | F | E | D | C | B | A |
|---|---|---|---|---|---|---|---|---|---|---|
| VALUE OF ACTUATED SWITCHES | 0 | 0 | 0 | 0 | 0 | 0 | 0 | 0 | 0 | 0 |
| | 0 | 0 | 0 | 0 | 0 | 0 | 0 | 0 | 0 | 1 |
| BINARY CODE | 0 0 | 0 0 | 0 0 | 0 0 | 0 0 | 0 0 | 0 0 | 0 0 | 0 0 | 0 1 |
| SELECTOR SWITCHES | 2 1 | 2 1 | 2 1 | 2 1 | 2 1 | 2 1 | 2 1 | 2 1 | 2 1 | 2 1 |
| IDENTIFIER CONFIGURATION | | | | | | | | | | |
| TOOL CODE | 0 | 0 | 0 | 0 | 0 | 0 | 0 | 0 | 0 | 1 |

FIG. 13

TOOL NO. 31

| POSITIONS | J | I | H | G | F | E | D | C | B | A |
|---|---|---|---|---|---|---|---|---|---|---|
| VALUE OF ACTUATED SWITCHES | 0 | 0 | 0 | 0 | 0 | 0 | 0 | 0 | 8 | 2 |
| | 0 | 0 | 0 | 0 | 0 | 0 | 0 | 16 | 4 | 1 |
| BINARY CODE | 0 0 | 0 0 | 0 0 | 0 0 | 0 0 | 0 0 | 0 0 | 0 1 | 1 1 | 1 1 |
| SELECTOR SWITCHES | 2 1 | 2 1 | 2 1 | 2 1 | 2 1 | 2 1 | 2 1 | 2 1 | 2 1 | 2 1 |
| IDENTIFIER CONFIGURATION | | | | | | | | | | |
| TOOL CODE | 0 | 0 | 0 | 0 | 0 | 0 | 0 | 1 | 3 | 3 |

FIG. 14

TOOL NO. 112

| POSITIONS | J | I | H | G | F | E | D | C | B | A |
|---|---|---|---|---|---|---|---|---|---|---|
| VALUE OF ACTUATED SWITCHES | 0 | 0 | 0 | 0 | 0 | 0 | 0 | 32 | 0 | 0 |
| | 0 | 0 | 0 | 0 | 0 | 0 | 0 64 | 16 | 0 | 0 |
| BINARY CODE | 0 0 | 0 0 | 0 0 | 0 0 | 0 0 | 0 0 | 0 1 | 1 1 | 0 0 | 0 0 |
| SELECTOR SWITCHES | 2 1 | 2 1 | 2 1 | 2 1 | 2 1 | 2 1 | 2 1 | 2 1 | 2 1 | 2 1 |
| IDENTIFIER CONFIGURATION | | | | | | | | | | |
| TOOL CODE | 0 | 0 | 0 | 0 | 0 | 0 | 1 | 3 | 0 | 0 |

FIG. 15

TOOL NO. 312

| POSITIONS | J | I | H | G | F | E | D | C | B | A |
|---|---|---|---|---|---|---|---|---|---|---|
| VALUE OF ACTUATED SWITCHES | 0 | 0 | 0 | 0 | 0 | 0 | 0 | 32 | 8 | 0 |
| | 0 | 0 | 0 | 0 | 0 | 256 | 0 | 16 | 0 | 0 |
| BINARY CODE | 0 0 | 0 0 | 0 0 | 0 0 | 0 0 | 1 1 | 0 0 | 1 1 | 1 0 | 0 0 |
| SELECTOR SWITCHES | 2 1 | 2 1 | 2 1 | 2 1 | 2 1 | 2 1 | 2 1 | 2 1 | 2 1 | 2 1 |
| IDENTIFIER CONFIGURATION | | | | | | | | | | |
| TOOL CODE | 0 | 0 | 0 | 0 | 0 | 1 | 0 | 3 | 2 | 0 |

FIG. 16

TOOL NO. 1023

| POSITIONS | J | I | H | G | F | E | D | C | B | A |
|---|---|---|---|---|---|---|---|---|---|---|
| VALUE OF ACTUATED SWITCHES | 0 | 0 | 0 | 0 | 0 | 512 | 128 | 32 | 8 | 2 |
| | 0 | 0 | 0 | 0 | 0 | 256 | 64 | 16 | 4 | 1 |
| BINARY CODE | 0 0 | 0 0 | 0 0 | 0 0 | 0 0 | 1 1 | 1 1 | 1 1 | 1 1 | 1 1 |
| SELECTOR SWITCHES | 2 1 | 2 1 | 2 1 | 2 1 | 2 1 | 2 1 | 2 1 | 2 1 | 2 1 | 2 1 |
| IDENTIFIER CONFIGURATION | | | | | | | | | | |
| TOOL CODE | 0 | 0 | 0 | 0 | 0 | 3 | 3 | 3 | 3 | 3 |

INVENTOR.
Robert K. Sedgwick
BY Cyril M. Hajewski
Attorney

FIG. 17

TOOL NO. 10,703

| POSITIONS | J | | I | | H | | G | | F | | E | | D | | C | | B | | A | |
|---|---|---|---|---|---|---|---|---|---|---|---|---|---|---|---|---|---|---|---|---|
| VALUE OF ACTUATED SWITCHES | 0 | 0 | 0 | 0 | 0 | 0 | 8192 | 0 | 2048 | 0 | 0 | 256 | 128 | 64 | 0 | 0 | 8 | 4 | 2 | 1 |
| BINARY CODE | 0 | 0 | 0 | 0 | 0 | 0 | 1 | 0 | 1 | 0 | 0 | 1 | 1 | 1 | 0 | 0 | 1 | 1 | 1 | 1 |
| SELECTOR SWITCHES | 2 | 1 | 2 | 1 | 2 | 1 | 2 | 1 | 2 | 1 | 2 | 1 | 2 | 1 | 2 | 1 | 2 | 1 | 2 | 1 |
| IDENTIFIER CONFIGURATION | | | | | | | | | | | | | | | | | | | | |
| TOOL CODE | 0 | | 0 | | 0 | | 2 | | 2 | | 1 | | 3 | | 0 | | 3 | | 3 | |

FIG. 18

TOOL NO. 93,243

| POSITIONS | J | | I | | H | | G | | F | | E | | D | | C | | B | | A | |
|---|---|---|---|---|---|---|---|---|---|---|---|---|---|---|---|---|---|---|---|---|
| VALUE OF ACTUATED SWITCHES | 0 | 0 | 0 | 65,536 | 0 | 16,384 | 8192 | 0 | 2048 | 1024 | 0 | 0 | 0 | 0 | 32 | 16 | 8 | 0 | 2 | 1 |
| BINARY CODE | 0 | 0 | 0 | 1 | 0 | 1 | 1 | 0 | 1 | 1 | 0 | 0 | 0 | 0 | 1 | 1 | 1 | 0 | 1 | 1 |
| SELECTOR SWITCHES | 2 | 1 | 2 | 1 | 2 | 1 | 2 | 1 | 2 | 1 | 2 | 1 | 2 | 1 | 2 | 1 | 2 | 1 | 2 | 1 |
| IDENTIFIER CONFIGURATION | | | | | | | | | | | | | | | | | | | | |
| TOOL CODE | 0 | | 1 | | 1 | | 2 | | 3 | | 0 | | 0 | | 3 | | 2 | | 3 | |

FIG. 19

TOOL NO. 263,485

| POSITIONS | J | | I | | H | | G | | F | | E | | D | | C | | B | | A | |
|---|---|---|---|---|---|---|---|---|---|---|---|---|---|---|---|---|---|---|---|---|
| VALUE OF ACTUATED SWITCHES | 0 | 262,144 | 0 | 0 | 0 | 0 | 0 | 0 | 0 | 1024 | 0 | 256 | 0 | 0 | 32 | 16 | 8 | 4 | 0 | 1 |
| BINARY CODE | 0 | 1 | 0 | 0 | 0 | 0 | 0 | 0 | 0 | 1 | 0 | 1 | 0 | 0 | 1 | 1 | 1 | 1 | 0 | 1 |
| SELECTOR SWITCHES | 2 | 1 | 2 | 1 | 2 | 1 | 2 | 1 | 2 | 1 | 2 | 1 | 2 | 1 | 2 | 1 | 2 | 1 | 2 | 1 |
| IDENTIFIER CONFIGURATION | | | | | | | | | | | | | | | | | | | | |
| TOOL CODE | 1 | | 0 | | 0 | | 0 | | 1 | | 1 | | 0 | | 3 | | 3 | | 1 | |

FIG. 20

TOOL NO. 813,673

| POSITIONS | J | | I | | H | | G | | F | | E | | D | | C | | B | | A | |
|---|---|---|---|---|---|---|---|---|---|---|---|---|---|---|---|---|---|---|---|---|
| VALUE OF ACTUATED SWITCHES | 524,288 | 262,144 | 0 | 0 | 0 | 16,384 | 8192 | 0 | 2048 | 0 | 512 | 0 | 0 | 64 | 32 | 0 | 8 | 0 | 0 | 1 |
| BINARY CODE | 1 | 1 | 0 | 0 | 0 | 1 | 1 | 0 | 1 | 0 | 1 | 0 | 0 | 1 | 1 | 0 | 1 | 0 | 0 | 1 |
| SELECTOR SWITCHES | 2 | 1 | 2 | 1 | 2 | 1 | 2 | 1 | 2 | 1 | 2 | 1 | 2 | 1 | 2 | 1 | 2 | 1 | 2 | 1 |
| IDENTIFIER CONFIGURATION | | | | | | | | | | | | | | | | | | | | |
| TOOL CODE | 3 | | 0 | | 1 | | 2 | | 2 | | 2 | | 1 | | 2 | | 2 | | 1 | |

FIG. 21

TOOL NO. 1,048,525

| POSITIONS | J | | I | | H | | G | | F | | E | | D | | C | | B | | A | |
|---|---|---|---|---|---|---|---|---|---|---|---|---|---|---|---|---|---|---|---|---|
| VALUE OF ACTUATED SWITCHES | 524,288 | 262,144 | 131,072 | 65,536 | 32,768 | 16,384 | 8192 | 4096 | 2048 | 1024 | 512 | 256 | 128 | 64 | 32 | 16 | 8 | 4 | 2 | 1 |
| BINARY CODE | 1 | 1 | 1 | 1 | 1 | 1 | 1 | 1 | 1 | 1 | 1 | 1 | 1 | 1 | 1 | 1 | 1 | 1 | 1 | 1 |
| SELECTOR SWITCHES | 2 | 1 | 2 | 1 | 2 | 1 | 2 | 1 | 2 | 1 | 2 | 1 | 2 | 1 | 2 | 1 | 2 | 1 | 2 | 1 |
| IDENTIFIER CONFIGURATION | | | | | | | | | | | | | | | | | | | | |
| TOOL CODE | 3 | | 3 | | 3 | | 3 | | 3 | | 3 | | 3 | | 3 | | 3 | | 3 | |

INVENTOR.
Robert K. Sedgwick
BY
Cyril M. Hajewski
Attorney

| BIT POSITIONS & SWITCH PAIRS | IDENTIFIER CONFIGURATION 0 | 1 | 2 |
|---|---|---|---|
| A | 0 | 1 | 2 |
| B | 0 | 3 | 6 |
| C | 0 | 9 | 18 |
| D | 0 | 27 | 54 |
| E | 0 | 81 | 162 |
| F | 0 | 243 | 486 |
| G | 0 | 729 | 1,458 |
| H | 0 | 2,187 | 4,374 |
| I | 0 | 6,561 | 13,122 |
| J | 0 | 19,683 | 39,366 |

INVENTOR.
Robert K. Sedgwick
BY Cyril M. Hajewski
Attorney

INVENTOR.
Robert K. Sedgwick
BY
Cyril M. Hajewski
Attorney 3,176,847
Patented Apr. 6, 1965

3,176,847

TOOL IDENTIFICATION SYSTEM

Robert K. Sedgwick, Waukesha, Wis., assignor to Kearney & Trecker Corporation, West Allis, Wis., a corporation of Wisconsin Filed July 20, 1962, Ser. No. 211,211
10 Claims. (Cl. 211—1.5)

The present invention relates to a tool identification system and more particularly to an improved identification coding for tools and a cooperating apparatus for individually identifying the tools by means of such coding.

A tool identification system utilizing coding mounted on the tools has been disclosed in a U.S. patent application, Serial No. 802,924, filed on March 30, 1959, now U.S. Patent No. 3,052,999. The number of different tools that can be identified by the arrangement shown in that application is limited by the space available on the coding structure. The increasing popularity of automatic tool changing mechanisms for machine tools has created a demand for a tool identification system capable of individually identifying a larger number of tools so that each tool that is ever employed in the machine tool can be separately identified. The arrangement disclosed in the above-mentioned patent application is limited for separately identifying large quantities of tools in the space available on the tool for receiving the coding structure.

It is therefore a general object of the present invention to provide an improved tool identification system for separately identifying different tools.

Another object of the present invention is to provide an improved tool identification system capable of identifying an infinitely larger number of tools without occupying a greater amount of space than is required by the prior systems.

Another object is to provide an improved tool identification system including a unique coding structure mounted on the tool and a cooperating selector mechanism adapted to read the coding structure for identifying the associated tool.

Another object is to provide an improved coding structure especially adapted to separately identify a relatively large number of tools while occupying a minimum amount of space on the tools.

Another object is to provide an improved tool identification system in which a specific type of coding is provided on the tool for actuating a plurality of switches arranged in a second type of coding to increase the capacity of the system with the switches being actuated in different combinations for identifying the different tools.

A further object is to provide an improved tool identification system that is of simple consrtuction but very reliable and efficient in operation.

According to this invention, identification of a large number of tools is accomplished by providing a plurality of identifier members or bits for each tool, with each bit space being adapted to receive an identifier member. The identifiers constituting external formations are disposed on each bit space according to a predetermined coded arrangement so that the identifiers serve to identify their associated tool. The identifiers are provided in several different configurations and each bit space may have an identifier of any one of the different configurations with each configuration representing a different value. Thus, each bit may represent different numerical values depending upon the configuration of the identifier that occupies the bit space. The tools are presented to a reading head having a plurality of pairs of switches which correspond in number to the number of bit or identifier members that the tools are provided with. As the individual tools move past the reading head, each bit or identifier member will selectively actuate the switches of an associated pair of switches of the reading head in binary code fashion. Thus, each bit or identifier member having one of a plurality of assigned different values, as represented by the particular identifier member configuration, will actuate the individual switches of an associated pair of switches in binary code fashion and the switches cooperate with each other to identify the tool.

The foregoing and other objects of the invention which will become more fully apparent from the following description of the invention herein illustrated may be achieved by the embodiments described herein and illustrated in the accompanying drawings, in which:

FIG. 10 is a chart containing exemplary tool numbers and showing their representation by the quaternary coding system for identifying tools from 1 to 1,048,575;

Figures 22, 23, 24:
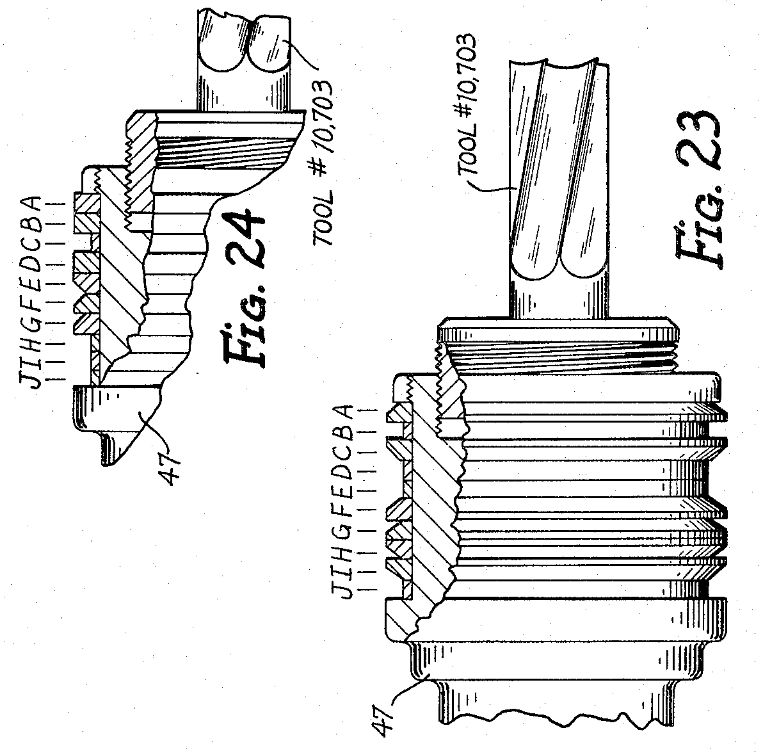
Figure 25:
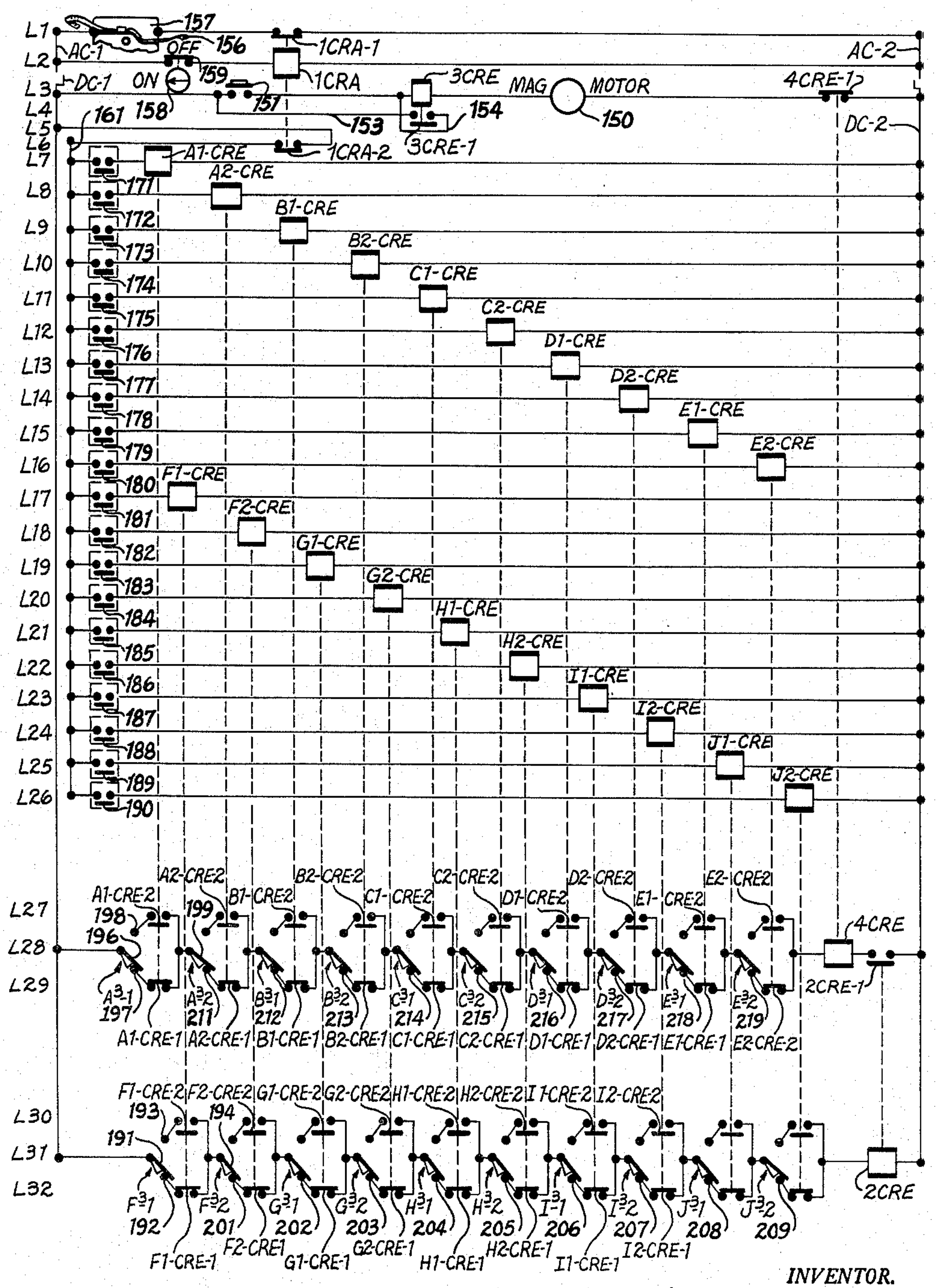

FIGS. 12 to 21, inclusive, are charts of individual tool numbers taken at random showing the quaternary tool code, the identifier member configurations and their bit positions, the selector mechanism switches which are associated with each bit position on the toolholder, the binary code representation for the particular number and the numerical value for the switches actuated by the particular identifier members shown beneath the switches;

FIG. 22 is a chart showing the numerical values assigned to each of the identifier members in particular bit positions on the tool for the ternary coding, along with an identification of the selector mechanism switches actuated by each of the identifier members;

FIG. 23 is a fragmentary view in section taken along the longitudinal axis of a toolholder showing identifier member configuration for identifying an end mill tool according to the ternary code system;

FIG. 24 is a fragmentary view of a toolholder showing identifier member configurations to identify the end mill tool shown in FIG. 23, according to the quaternary code system; and, FIG. 25 is a diagrammatic view of the electrical control circuit for selecting the desired tool for location at the tool change station.

In present production methods, the use of a single machine tool capable of performing many different metal removing operations and employing different types and sizes of tools is in wide use to reduce the cost of manufacture and expedite production. In such machine tools, different types of tools, such as taps, drill, milling cutter, etc., are used for performing different machining operations and these different types of tools are of varying sizes. The present invention provides a coding arrangement for identifying each of the different tools and a selector mechanism adapted to read the coding structure for automatically identifying the tools and for selecting the desired tool from a group of tools contained in a tool storage member.

The coding structure comprises a plurality of bits or identifier members on a toolholder that is adapted to receive a tool, with the exemplary embodiment illustrated in the drawings providing ten bit spaces to receive ten bits or identifier members. Each bit space is adapted to receive an external formation or identifier member that may be of four different forms, two of which have cylindrical configurations of different diameters and two of which have different profiles of the same cylindrical diameter, so that identification of 1,048,575 individual tools is possible. It is also contemplated that the aforesaid ten identifier members or bits can be employed as two groups of five bits each so that one group of bits will identify a particular family or type of tool. In this combination, 1023 different families or types of identifications are possible. The second group of five bits are employed to identify the size of the tools in each family and is capable of identifying 1023 individual tools. Thus, in combination, the 1023 families or types of tools with 1023 individual tools in each family makes it possible to identify 1,046,529 individual tools.

Figure 1:
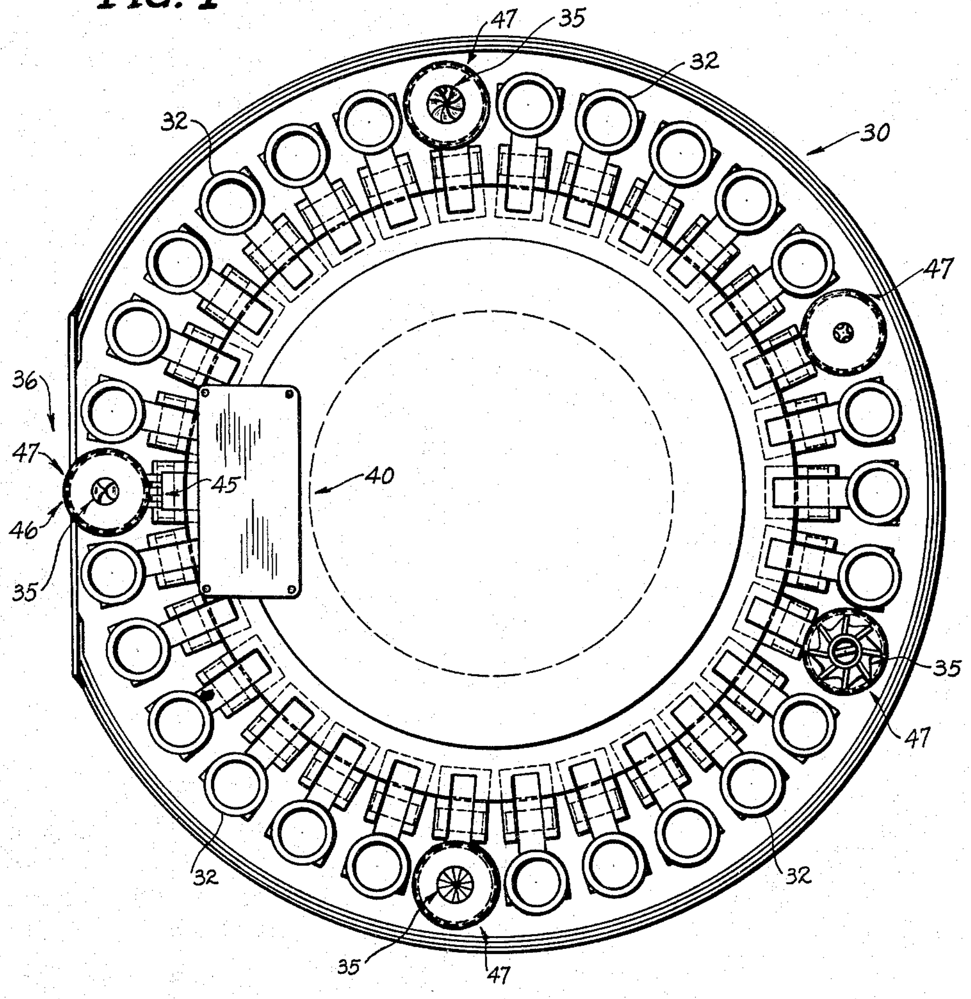
FIGURE 1 is a view in front elevation of a rotatable tool storage magazine adapted to carry a plurality of different types and sizes of material removing tools together with a tool selector mechanism positioned to identify each tool as it moves with the rotation of the magazine.

Referring now to FIG. 1, the present invention is illustrated in conjunction with a power driven tool storage magazine 30 which is supported for rotation on the machine tool [not shown]. The magazine 30 is provided with a plurality of tool storage sockets 32 each of which is adapted to removably support a tool 35. The magazine 30 is provided with a tool change station 36 at which the magazine 30 is adapted to locate a selected tool 35 for a tool change operation. Adjacent to the tool change station 36, a tool selector mechanism 40 is provided and supported thereat on a fixed portion of the magazine. As shown, the selector mechanism 40 is provided with trip fingers, generally identified by the reference numeral 45, which are arranged to extend into the path of travel of the individual tools 35 as they are rotatably moved past the tool change station 36. The fingers 45 are adapted to specifically engage coded identifier members or bits 46 fixedly secured in individual bit spaces on the toolholders 47 in which the tools 35 are retained.

Figure 2:
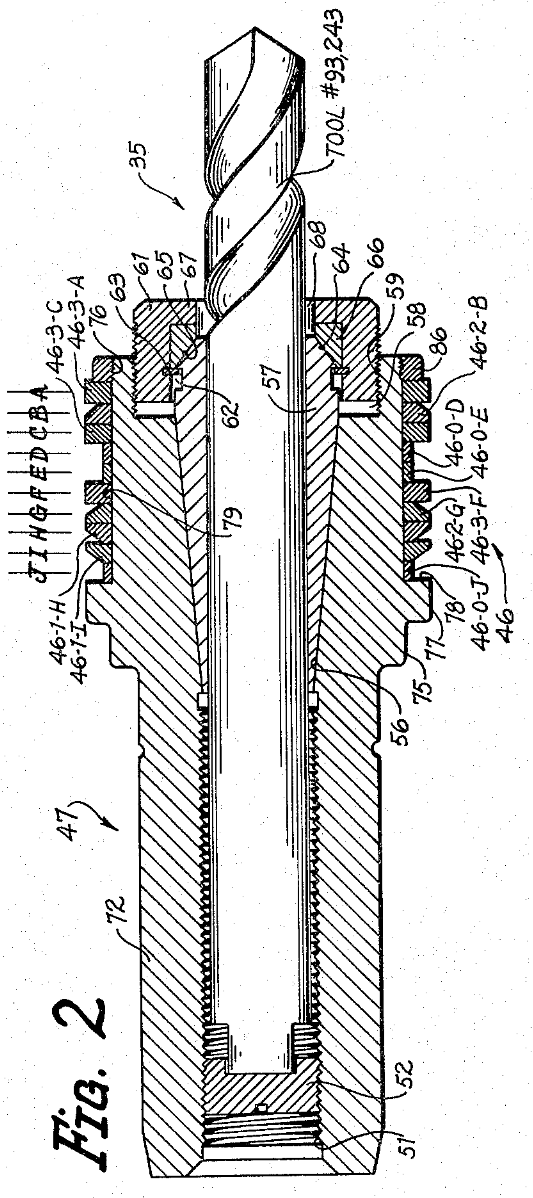
FIG. 2 is a detailed view in section taken along the longitudinal axis of a toolholder showing a quaternary coding structure mounted thereon.

As shown in FIG. 2, a toolholder 47, preferably of cylindrical configuration, is provided with an axial bore 51 provided with threads adapted to receive a positioning plug 52 against which the inner end of a tool is positioned. As viewed in FIG. 2, the right end of the bore 51 is contiguous with a bore 56 which extends rightwardly and outwardly to form a conical opening adapted to receive a split collet 57 having an externally tapered surface complementary to that of the bore 56. The outwardly flared bore 56 terminates in a cylindrical recess 58 provided with internal threads 59 adapted to receive a clamp ring 61. A circumferentially extending groove 62, formed on the forward or outward portion of the split collet 57, receives a snap ring 63 carried by the clamp ring 61. The nose portion 64 of the collet 57 is tapered and is engaged by the conical inner surface 65 of a plug 66 seated in the clamp ring 61 against a radial inwardly extending flange 67 formed in the clamp ring. The inwardly extending flange 67 forms an axial opening 68 in the clamp ring 61 through which the shank of the tool may be inserted. With the tool inserted into the toolholder, the clamp ring 61 is tightened in the toolholder and the tapered plug 66 operates to move the collet axially inwardly into the tapered bore 56 thereby compressing the associated portion of the collet into tight engagement with the shank of the tool. The conical surface of the plug also engages the tapered nose of the collet to compress the nose portion of the collet tightly against the shank of the tool.

The rearward portion 72 of the toolholder 47 is of cylindrical form that is receivable in the operating spindle of the machine and also receivable in the tool storage socket 32 of the tool storage magazine 30, shown in FIG. 1. The holder 47 includes an enlarged cylindrical forward portion 75 provided at its forward end with threads 76. A circumferential flange 77, having a machined front face 78 is provided on the enlarged portion 75 of the toolholder at the inner end thereof. Forwardly of the flange 77, the enlarged portion 75 of the holder is provided with a machined cylindrical surface 79 providing for ten bit spaces which slidably receive the code identifier members or bits 46. The identifier members or bits 46 for each individual tool comprise ten rings which are slidably disposed on the machined cylindrical surface 79 of the toolholder and constitute actuators and identifying means for a ten digit code system. The bit positioned identifier members on the toolholder 47, as shown in FIG. 2, serve to identify the type and size of the particular tool.

Figure 6:
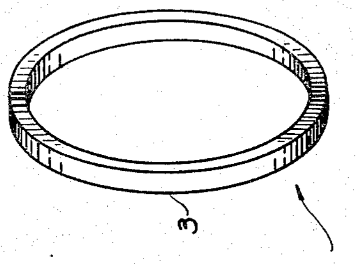
FIG. 6 is a perspective view of a fourth configuration of an identifier member or bit.
Figure 5:
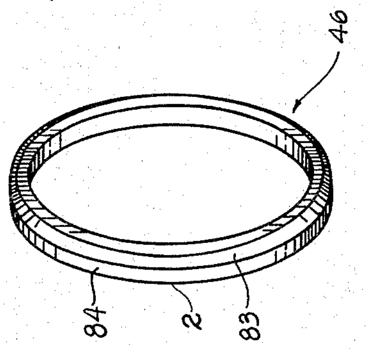
FIG. 5 is a perspective view of a third configuration of an identifier member or bit.
Figure 4:
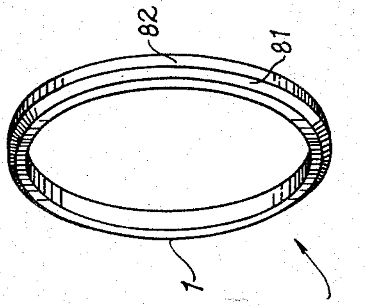
FIG. 4 is a perspective view of a second configuration of an identifier member or bit.
Figure 3:
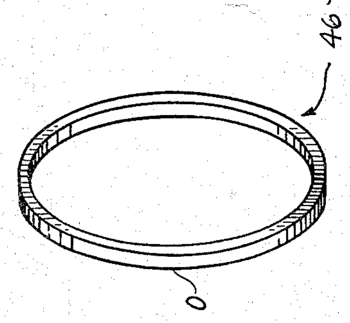
FIG. 3 is a perspective view of one configuration of an identifier member or bit.

Each identifier member may be in any one of the four different forms or configurations that are illustrated in FIGS. 3 to 6, inclusive, and which are identified in the drawings by the reference numbers 0 to 3 respectively. The identifier member or bit configuration depicted in FIG. 3 is of relatively small diameter and is identified as identifier member configuration 0. The second identifier member or bit configuration 1 is shown in FIG. 4. It is of a larger diameter than configuration 0 and is provided with a leftwardly inclined bevel along its left peripheral edge to form a frusto conical surface 81, the large diameter of which intersects the peripheral surface 82 of the ring to the right of a plane that passes through the center of the ring and which is perpendicular to its axis. A third identifier member or bit configuration 2 is shown in FIG. 5, and is of the same diameter as the identifier member configuration 1. Identifier member configuration 2 is provided with a rightwardly inclined bevel along its right peripheral edge to form a frusto conical surface 83, the large diameter of which intersects the peripheral surface 84 of the ring to the left of a plane that passes through the center of the ring and which is perpendicular to its axis. Identifier member configuration 3 is shown in FIG. 6 and is a symmetrical ring having the same diameter as configurations 1 and 2. The identifier member configurations 0, 1, 2 and 3 all have the same width dimensions so that any one identifier member or bit configuration will occupy only one bit space or portion on the surface 79. For this purpose, the width of the machined surface 79 conforms substantially to the space occupied by ten identifier member or bit configurations and this machined surface 79 is divided into ten annular surfaces of substantially equal width extending about the periphery of the toolholder with each annular surface defining an area that constitutes a bit space for receiving one of the identifiers or bits 46. Accordingly, there are ten bit spaces or positions on the toolholder, which, for the purpose of this description, are identified as A, B, C, D, E, F, G, H, I and J, starting from the tool end of the holder, as viewed in FIG. 2. Consequently, as will hereinafter be more fully explained, each of the bit spaces or positions, A to J inclusive, provide a different code value depending upon the particular configuration of the identifying member which occupies the particular bit space.

In order to facilitate the present description, the identifier members associated with a toolholder will be identified by the general identifier member reference numeral followed by the particular identifier member configuration reference and also the identifying reference numeral, which, in turn, will be followed by the reference letter for the toolholder bit space in which the identifier member is located. Thus, the particular identifier members assembled on the toolholder 47, shown in FIG. 2, are identified from right to left as 46–3–A; 46–2–B; 46–3–C; 46–0–D; 46–0–E; 46–3–F; 46–2–G; 46–1–H; 46–1–I and 46–0–J. The identifier members arranged in code fashion, represent a quaternary code which operates to identifiy the particular type and size of tool in the holder. The series of identifier members are retained in selected bit position on the cylindrical machined surface 79 by means of a locking ring 86 engaged on the forward threaded end of the toolholder.

Thus, a tool is provided with ten bit spaces, each of which is adapted to receive an identifier member of one of the four different configurations. The arrangement constitutes a quaternary code wherein each identifier member or bit represents one digit of the code because each of the digits may be assigned any one of four different values as represented by the four different configurations which the identifier member may have.

For example, the identifier member in bit position A on the toolholder may have a value of 0, 1, 2 or 3, while the identifier member in bit position B on the toolholder may have a value of 0, 4, 8 or 12. The identifier member in bit position C on the toolholder may have a value of 0, 16, 32 or 48, while the identifier member in bit position D on the toolholder may have a value of 0, 64, 128 or 192. The other identifier members or bits may have four different values, each of which is four times greater than the values for the corresponding preceding bit. Thus, values for the E positioned bit may be 0, 256, 512 or 768; the value for the F positioned bit may be 0, 1024, 2048 or 3072; the value for the G positioned bit may be 0, 4096, 8192 or 12,288; the value for the H positioned bit may be 0, 16,384, 32,768 or 49,152; the value for the I positioned bit may be 0, 65,536, 131,072 or 196,608; and, the value for the J positioned bit may be 0, 262,144, 524,288 or 786,432.

Thus, each identifier member or bit may have four different values and its value is determined by the configuration of the identifier member that occupies a particular bit space or position. Therefore, an identifier member or bit of configuration 0 will express the zero value of a bit, while an identifier member of configuration 1 will express the next value of the bit; and identifier member of configuration 2 will express the third value of the bit; and, an identifier member of configuration 3 will express the highest value for the bit. By totalling the values of each identifier member or bit, as determined by the particular identifier member configuration on the toolholder, the number of a particular tool may be ascertained. For example, assuming that the ten identifier members or bits on the toolholder were all of configuration 3, then each bit would have its highest value and the values expressed would be 3, 12, 48, 192, 768, 3072, 12,288, 49,152, 196,608 and 786,432. By summing these values, a value of 1,048,575 will be obtained, which would be the number of the particular tool.

The selective positioning of the four different configurations of the identifier members 46 in the ten bit spaces of the toolholder 47 in different combinations constitutes a quaternary code for identifying individual tools from 1 to 1,048,575. The development of the quaternary code is shown in the chart of FIG. 10 where the individual code expressions for tools from 1 to 32, inclusive, are successively shown. Tool Nos. from 32 to 1,048,575 are selectively shown. The quaternary code expression for a tool number not shown may be ascertained by dividing the decimal number of the desired tood by four and the remainder constitutes the first digit of the quaternary code. The answer obtained by dividing the original decimal number, but not including the remainder, is, in turn, divided by four and the remainder obtained from this division is the second digit of the quaternary code. The answer obtained from the second division, but not including the remainder, is then divided by four and the remainder of the third division is the third digit of the code. This procedure is continued in this manner until all of the digits of the code are calculated. This information can then be utilized for assembling the identifier members on the cylindrical surface 79 of the toolholder 47 in the proper combination for identifying the desired tool.

For example, assuming that the code expression of tool No. 263,485 is desired, the method for obtaining the code expression is as follows:

4/263,485
4/65,871–1–A
4/16,467–3–B
4/4,116–3–C
4/1,029–0–D
4/257–1–E
4/64–1–F
4/16–0–G
4/4–0–H
4/1–0–I
0–1–J

Thus, the quaternary code expression for tool No. 263,485 is 1000110331.

Each vertical column of the chart of FIG. 10, except the first, represents a corresponding bit position on the toolholder and is therefore identified by the same letter of the alphabet as are the bit spaces or positions. Thus, from the chart of FIG. 10, tool No. 1 is identified by the quaternary code expression of 0000000001, where the numeral 1 indicates the particular identifier member or bit configuration to be positioned on the toolholder in the bit position A, while 0 represents the identifier member configurations to be positioned on the toolholder in the remaining bit positions. Tool No. 2 is identified by the quaternary code expression 0000000002, where the numeral 2 in the A column indicates the identifier member configuration that is to be placed in bit position A on the toolholder, while the zeros in columns B to J, inclusive, indicate the identifier member configurations which are to be placed in bit positions B to J, inclusive, on the toolholder.

Similarly, tool No. 3 is identified by the quaternary code expression 0000000003, where the numeral 3 in the A column indicates the identifier member configuration which is to be placed in bit position A on the toolholder, while the zeros in columns B to J, inclusive, indicate the identifier member configurations which are to be placed in bit positions B to J, inclusive, on the toolholder.

Thus, the identifier members 46 arranged in quaternary code fashion on the cylindrical surface 79 of the toolholder 47 serve to identify the type and size of the individual tool retained in the toolholder.

Figures 7, 8:
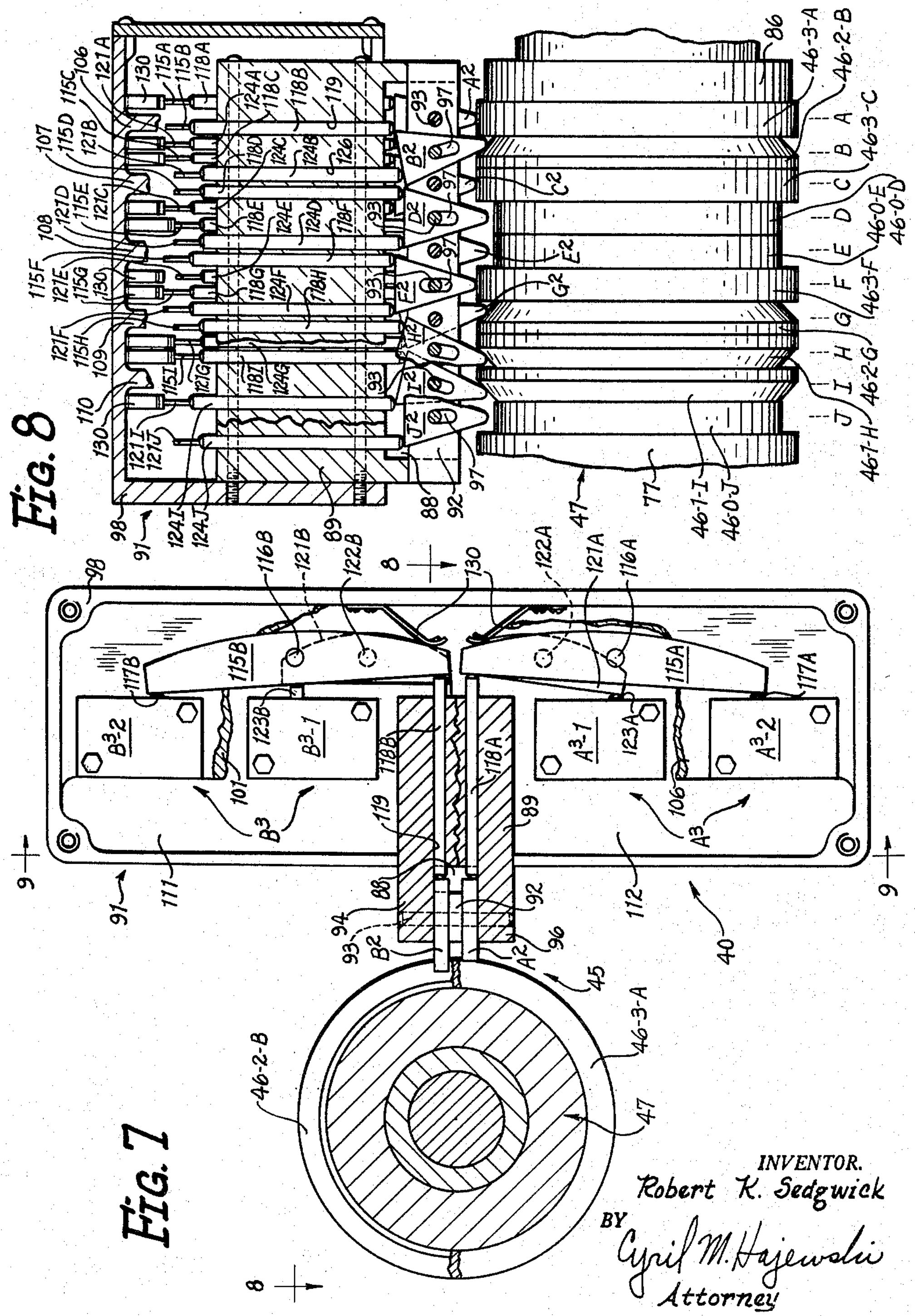
FIG. 7 is a front elevational view of the selector mechanism with parts broken away to show portions of its operating mechanism.
FIG. 8 is a detail view in horizontal section through the selector mechanism, taken along the plane represented by the line 8—8 in FIG. 7, and with a portion broken away to show the lower trip fingers and their associated actuating rods.
Figures 9, 11:
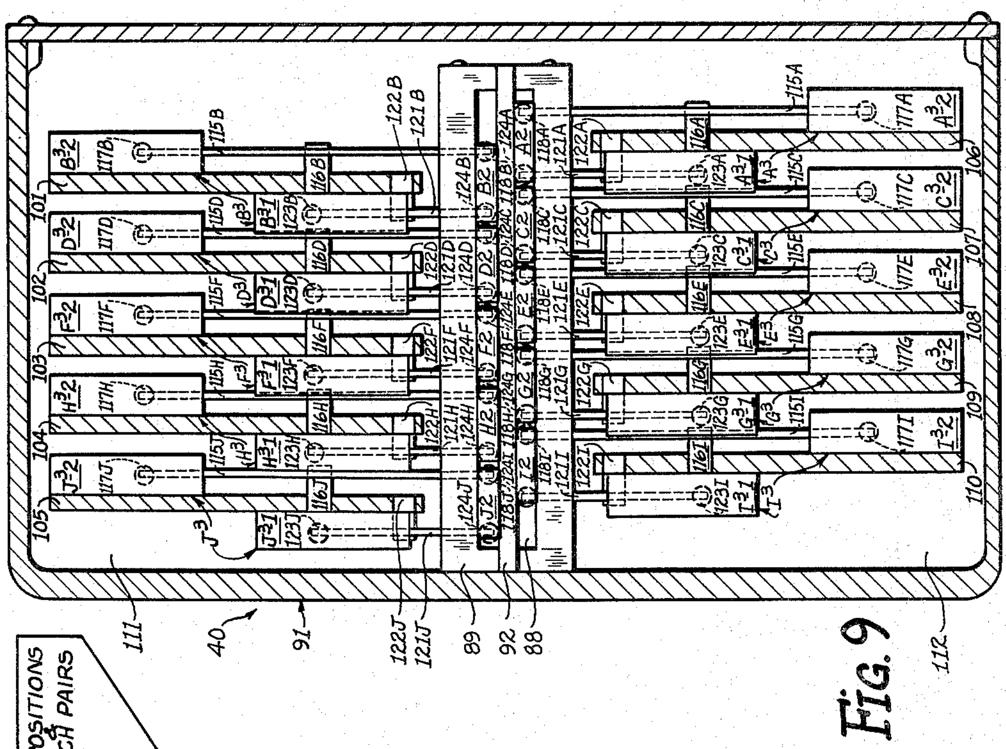
FIG. 9 is a view in vertical section through the selector mechanism taken along the plane represented by the line 9—9 of FIG. 7, showing upper and lower trip finger arrangements, associated switches and actuating mechanism.
FIG. 11 is a chart showing the numerical values assigned to each of the identifier members in particular bit positions on the tool for the quaternary coding, along with an identification of the selector mechanism switches actuated by each of the identifier members.

The quaternary code expression indicated by the identifier members 46 on each toolholder is read by the tool selector mechanism or tool indicator 40, shown in detail in FIGS. 7, 8 and 9. To this end, the ten identifier members 46 on the toolholder 47 actuate ten cooperating movable trip fingers $A^2$ to $J^2$, inclusive, which form a part of the selector mechanism 40. Such actuation of the trip fingers occurs as the respective toolholder 47 move past the tool selector mechanism 40. The trip fingers $A^2$ to $J^2$ are of triangular configuration cooperatively supported for pivotal movement and for movement in a direction parallel to their height. As shown in FIGS. 8 and 9, the trip fingers are positioned so that the apex of each triangular trip finger is normally positioned to coincide with the center of an associated identifier member on the toolholder. Thus, trip finger $A^2$ is positioned to cooperate with an identifier member in bit position A on the toolholder, while trip finger $B^2$ is positioned to cooperate with an identifier member in bit position B of the holder, etc. In order to space the trip fingers to correspond with the spacing of the identifier member 46, the trip fingers are disposed in alternate rows of five trip fingers each. The lower row contains trip fingers $A^2$, $C^2$, $E^2$, $G^2$ and $I^2$, while the upper row contains trip fingers $B^2$, $D^2$, $F^2$, $H^2$ and $J^2$. The trip fingers $A^2$ to $J^2$ are located within a rectangular recess 88 formed in a block 89 that is rigidly secured in a housing 91 and extends outwardly thereof so as to position the trip fingers in the path of movement of the tools. The two rows of trip fingers are separated from each other by means of a spacer plate 92.

To maintain the trip fingers in their prescribed locations in the block 89, a dowel 93 is provided for each trip finger. These dowels are fitted into holes provided in the block 89 and each dowel 93 extends through the spacer plate 92 and through an elongated opening 97 formed in its associated trip finger. In this manner, the dowels 93 maintain each trip finger in its prescribed position relative to a corresponding toolholder bit position and each trip finger is normally disposed in a straight forward position, as viewed in FIG. 8, and as exemplified by the position of the trip fingers $D^2$, $E^2$ and $J^2$. However, each trip finger is pivotable to a rightward position, as viewed in FIG. 8, and as exemplified by the position of trip fingers $B^2$ and $G^2$, and to a leftward position as exemplified by the fingers $H^2$ and $I^2$. Furthermore, each finger can be moved rearwardly of its normal forward position as exemplified by the position of fingers $A^2$, $C^2$ and $F^2$.

It is apparent, therefore, that each of the ten trip fingers $A^2$ to $J^2$ can be moved into four different positions and they are shifted out of their normal positions by engagement with the identifier member or bit configurations 1, 2 or 3 as they move past the trip fingers with the toolholders 47 on which they are mounted. When a bit space on the toolholder 47 contains an identifier member 46 of configuration 0, the identifier member does not engage the associated trip finger and the latter remains in its normal position to indicate a zero for that digit of the quaternary code. However, the trip fingers are pivoted leftwardly when engaged by the identifies members of configuration 1, the conical surface 81 of which engages the right side of the trip fingers, as viewed in FIG. 8, when the tools are moved in their rotational path of travel past the selector mechanism 40, forcing the trip fingers to the left. Rightward pivoting of the trip fingers is effected by identifier members or bits of configuration 2, the conical surface 83 of which engages the left side of the trip fingers as viewed in FIG. 8, as the tools are moved in their rotational path of travel past the selector mechanism. Identifier member configuration 3 presents a cylindrical surface which shifts the trip fingers in a straight rearward direction when it is moved into engagement therewith. Thus, each individual tool moving past the selector mechanism will cause each of the trip fingers of the selector mechanism 40 to be located in a particular position and the identifier member configurations on each tool holder are arranged according to the quaternary code, shown in the chart of FIG. 11, for identifying individual tools of a plurality of different types and sizes.

The quaternary code created by each combination of identifier member configurations on the toolholders 47 represents a tool number, and such quaternary code is converted to the binary code representing the same tool number by the actuation of a plurality of switches arranged in binary code fashion.

Each digit of the binary system is either "OFF" or "ON" as indicated by 0 or 1 respectively. Since there are 1,048,575 individual tools to be identified, twenty digits of the binary system are provided. Thus, the binary number 00000000000000000001 will identify tool No. 1, while the binary number 11111111111111111111 will identify tool No. 1,048,575. Each digit of the binary code is related to an individual switch that may be either "ON" or "OFF" with the numeral 1 indicating that the switch is actuated and therefore "ON" while the numeral 0 indicates that the switch is deactuated or "OFF." In order to accommodate the twenty digits of the binary system, twenty switches are provided so that each represents one of the digits.

The twenty switches of the tool selector mechanism 40 are divided into ten pairs. Each pair of switches is associated with a particular bit position on the toolholder and an associated trip finger, and is identified by the same letter of the alphabet as its associated bit space or position but the latter is followed by exponent 3. Thus, as shown in FIG. 9, the pair of switches associated with bit position A of the toolholders and trip fingers $A^2$ is generally identified by the reference character $A^3$. The individual switches of the pair $A^3$ are identified by the pair reference character $A^3$ followed by –1 or –2. In like manner, the pair of switches associated with bit position B of the toolholders and trip fingers $B^2$ is generally identified by the reference character $B^3$. The switches of the pair $B^3$ are individually identified by the pair reference characters $B^3$ followed by –1 or –2. The other eight pairs of selector switches are identified by the reference characters $C^3$, $D^3$, $E^3$, $F^3$, $G^3$, $H^3$, $I^3$ and $J^3$ with the individual switches of each pair being identified by the pair reference characters followed by –1 or –2.

The individual switches of the selector mechanism are fixedly secured in the selector housing 91 to internal spaced webs 101 to 110, inclusive, which are formed from the interior surface of the back wall 98 of the housing and extend forwardly therefrom. The pairs of switches $B^3$, $D^3$, $F^3$, $H^3$ and $J^3$ associated with the tip fingers $B^2$, $D^2$, $F^2$, $H^2$ and $J^2$, respectively, are disposed in an upper portion 111 of the housing, while the pairs of switches $A^3$, $C^3$, $E^3$, $G^3$ and $I^3$ associated with the trip fingers $A^2$, $C^2$, $E^2$, $G^2$ and $I^2$, respectively, are disposed in a lower portion 112 of the housing.

As shown in FIGS. 7 and 9, the individual switches of the pairs of switches in the lower portion 112 of the housing are disposed therein in alternate spaced arrangement in both vertical and lateral directions. Similarly, the individual switches of the pairs of switches in the upper portion 111 of the housing are disposed therein in alternate spaced arrangement in both vertical and lateral directions. This arrangement provides a compact assembly while providing sufficient room for individual switch mechanisms.

The actuating mechanism between each individual trip finger and its associated pair of switches for actuating the individual switch of the associated pair is identical and therefore a description of the mechanism associated with trip finger $B^2$ will be given and such description will apply to all trip fingers and their associated mechanisms.

As shown in FIGS. 7, 8 and 9, the switches $B^3$–1 and $B^3$–2 associated with the trip finger $B^2$ are secured to web 101 on either side thereof with switch $B^3$–1 being located in a plane below the switch $B^3$–2. A relatively long rocker arm 115B is pivotally supported on a stub shaft 116B which is fixedly secured in the web 101 and extends laterally therefrom. One end of the arm 115B is adapted to engage the actuating plunger 117B of the rearwardly facing switch $B^3$–2 while its opposite end is adapted to engage the extending end of an actuating rod 118B. The actuating rod 118B is slidable within a bore 119 formed in the block 89 and is of a length so that its opposite end engages the right corner of the base of the trip finger $B^2$, as viewed in FIG. 8.

A similar arrangement is provided for the switch $B^3$–1, in that a rocker arm 121B, of relatively short length, is pivotally supported on a stub shaft 122B which is fixedly secured in the web 101 but which extends laterally therefrom in a direction opposite to the direction in which the stub shaft 116B extends. One end of the arm 121B is adapted to engage the actuating plunger 123B of the rearwardly facing switch $B^3$–1, while its opposite end engages the extending rear end of an actuating rod 124B, shown in FIG. 8. The actuating rod 124B is slidable within a bore 126, formed in the block 89 parallel to the bore 119, and its length is equal to the length of the rod 118B. The forward end of the rod 124B adjacent the trip finger $B^2$ engages the left corner of the base of the trip finger $B^2$, as viewed in FIG. 8.

With the arrangement described above, an identifier member of configuration 2 disposed in bit position B on a toolholder will effect pivotal movement of the trip finger $B^2$ in a rightward direction about its fixed vertical dowel 93 to the position shown in FIG. 8. In this position, the right hand corner of the base of the trip finger forces the actuating rod 118B inwardly. Such movement of the rod 118B causes it to act against the adjacent lower end of the rocker arm 115B, as viewed in FIG. 7, causing the rocker arm to pivot on the stub shaft 116B so that its opposite or upper end will react against the plunger 117B of the switch $B^3$–2, to actuate the switch. During this action, the left hand corner of the base of the trip finger $B^2$ moves in a counterclockwise direction, as viewed in FIG. 8, so that the associated actuating rod 124B, FIG. 8, does not move but remains in its forward position as shown. As a result, the associated short rocker arm 121B is maintained in a vertical neutral position, as shown in FIG. 7, so that switch $B^3$–1 remains deactuated.

On the other hand, if the identifier member in bit position B on the toolholder is of configuration 1, it would effect pivotal movement of the trip finger $B^2$ to the left, as viewed in FIG. 8, from a normal forward position. Leftward pivotal movement of the trip finger $B^2$ will cause the actuating rod 124B to move rearwardly thereby effecting pivotal movement of the short rocker arm 121B in a counterclockwise direction, as viewed in FIG. 7. Pivotal movement of arm 121B in a counterclockwise direction operates to actuate the plunger 123B of switch $B^3$–1 thereby actuating the switch. With leftward pivotal movement of the trip finger $B^2$, the right hand corner of its base will move in a clockwise direction, so that the actuating rod 118B remains stationary in its forward position. Thus, the associated rocker arm 115B would also remain in a vertical neutral position so that switch $B^3$–2 is not actuated.

However, assuming that the identifier member in bit position B on the toolholder is of configuration 3, the trip finger $B^2$ would be moved straight rearwardly when it is engaged by the identifier member of configuration 3. Such movement of the trip finger $B^2$ causes both actuating rods 118B and 124B to move rearwardly causing both rocker arms 115B and 121B to pivot in a counterclockwise direction so that both of the switches $B^3$–2 and $B^3$–1 will be actuated.

Now assuming that the identifier member in bit position B on the toolholder is of configuration 0, as the toolholder moves into operating relationship with the tool selector mechanism 40, the identifier member of configuration 0 being of relatively small external diameter would not engage the tip of the forwardly disposed trip finger $B^2$. Thus, both rocker arms 115B and 121B would remain in their vertical neutral position and neither switch would be actuated.

As previously mentioned, the individual switches are maintained deactuated when the individual associated rocker arms are in a vertical neutral position. Also, as previously mentioned, the normal position of the individual trip fingers is a straight forward position, as exemplified by the position of trip fingers $D^2$, $E^2$ and $J^2$ in FIG. 8. This condition is obtained by individual spring members 130 acting against the rocker arms to urge their associated actuating rods forwardly. Each spring 130 is secured to the inner surface of the back wall 98 of the housing and is adapted to engage the back edge of associated rocker arm, adjacent the end that engages the end of the actuating rod. The individual springs 130 exert a force upon the end of their associated rocker arms to urge the rocker arms into a vertical position. As each rocker arm is biased to its vertical neutral position it, in turn, will move its associated actuating rod forwardly or leftwardly, as viewed in FIG. 7. Each actuating rod, in turn, exerts a forwardly acting force upon its particular trip finger. Since each trip finger has two actuating rods associated with it, each of which engages the opposite base corner thereof, the combined effort of both actuating rods of any particular trip finger will cause the associated trip finger to be urged to its normal straight forward position, such condition being exemplified by the position of trip finger $D^2$ in FIG. 8.

When the coded toolholders are moving in their path of travel and no toolholder is in operating relationship with the tool selector mechanism 40, all the trip fingers $A^2$ to $J^2$, inclusive, will be biased into normal straight forward position. Under this condition, all switches will be deactuated. As the succeeding toolholder moves into operating relationship with the tool selector mechanism 40, the coded tool identifier members or bits 46 thereon will engage the trip fingers to move each individual trip finger to the position dictated by the particular identifier member configuration which engages it.

As the tools are moved past the fixed selector mechanism 40 under the rotating movement of the tool storage magazine 30, the individual quaternary coded tools are read by the trip fingers of the selector. This action effects selective actuation of the plurality of switches in binary code fashion. The switches are a part of an electrical system which receives information that designates which tool is to be located at the tool change station 36 and regulates the rotation of the magazine 30. When the actuations of the binary switches in the selector 40 corresponds to the number impressed upon the electrical designation circuit, the movement of the tool storage magazine 30 is automatically stopped with the specified tool in position at the tool change station 36 so that it may be withdrawn from the tool storage magazine and transferred to the machine spindle.

Each of the switches in the tool selector mechanism 40 is assigned a value in accordance with the binary system, and each switch represents its assigned value when it is actuated or "ON." When the switch is deactuated or "OFF," it establishes a zero value for the digit which it represents in the binary system. Thus, each switch can represent two values, one of which is zero for every switch and the other value varies for each switch, depending upon which digit of the binary system it represents.

On the other hand, each bit of the quaternary coded toolholder can represent either one of four values depending upon the configuration of the identifier member 46 that is placed in the bit space. When the identifier member 46 of the configuration 0 is placed in any bit space, that bit space, regardless of which of the ten bit spaces it is, has a value of zero. However, the other three values for each bit space vary from bit space to bit space, depending upon what digit of the quaternary code the bit space represents, and the four different values for each bit space or position are obtained by placing one of the four different configurations of the identifier member 46 in the bit space or position.

As previously mentioned, the twenty switches of the present exemplary embodiment are divided into ten pairs and each pair cooperates with one of the ten identifier members or bits that form the quaternary code on the toolholder. The four values for each identifier member or bit of the quaternary code are established by actuating the two switches that cooperate with that particular combination in four different combinations. The first value of every identifier member or bit, as previously mentioned, is zero. The second value of the identifier member or bit in the quaternary code corresponds to the binary system value assigned to the first switch in the pair and cooperates with that particular identifier member or bit. The third value of the identifier member or bit in the quaternary code corresponds to the binary system value assigned to the second switch in the pair that cooperates with that particular identifier member or bit. The fourth value of the identifier member or bit in the quaternary code corresponds to the sum of the two binary system values assigned to the two switches in the pair.

Accordingly, if zero value is desired for any particular digit of the quaternary code, an identifier member or bit 46 of configuration 0 is placed in the associated bit space or position, and when the toolholder moves into operating relationship with the selector mechanism 40, neither one of the two binary switches that cooperate with that bit space of the quaternary code will be actuated, to indicate a zero value for that digit. When it is desired that a particular digit of the quaternary code have the second value, an identifier member 46 of configuration 1 is placed in that particular associated bit space and it will actuate the first switch of the pair which corresponds in value in the binary system to the second value of the associated identifier member or bit in the quaternary system. When the third value of the identifier member or bit in the quaternary code is desired, identifier member 46 of configuration 2 is placed in proper bit position and it will actuate the second switch of the pair which corresponds in value in the binary system to the third value of that particular bit in the quaternary code. When the fourth value of the bit in the quaternary code is desired, the identifier member 46 of configuration 3 is placed in proper bit space and it functions to actuate both switches of the associated pair because the fourth value of the quaternary bit corresponds in value to the sum of the values of both switches of the pair in the binary system.

This relationship is best shown in the chart of FIG. 11 wherein the four identifier configurations 0, 1, 2 and 3, are indicated at the top of four separate vertical columns. The fifth vertical column indicates the toolholder bit positions A to J, inclusive, with each letter being at the end of a horizontal line to identify that horizontal line as a bit position space. The first four vertical columns, beneath the identifier member configuration headings, lists the value of the binary switches with each switch value being listed in the vertical column that is headed by the identifier member configuration which actuates the switch, and further, with each switch value being listed in the horizontal line that identifies the bit position in which the identifier member must be located to actuate the switch that is assigned the listed value.

From this chart, the value of a switch that is actuated by any of the identifier members 46 in any bit position on the toolholder 47 can be easily ascertained. Of course, if an identifier member 46 of configuration 0 is located in any bit position, no switches are actuated by the identifier member in that bit position and its value is 0 as indicated in the first vertical column of the chart. If identifier member 46 of configuration 1 is located in bit position or space F on the toolholder 47, the value of the switch that will be actuated by this identifier member can be readily determined. Thus, the second vertical column is headed by the configuration No. 1 and proceeding down this column to the horizontal line representing the bit position F, the value 1024 is found for the switch that will be actuated by an identifier member of configuration 1 in bit position F. By the same token, if an identifier member of configuration 3 is located in bit position D on the toolholder 47, the sum of the two values 64 and 128 is found in the vertical column headed by the configuration No. 3 in the horizontal line representing the bit position D. This indicates that an identifier member 46 of configuration 3 located in bit position D will simultaneously actuate two switches, one having an assigned value of 64 and the other having an assigned value of 128, so that the bit position will produce a total value of 192.

Since each of the switch pairs is identified by a reference character that includes the character which identifies the bit position with which the switch pair is associated, the value of any switch may also be conveniently ascertained from the chart in FIG. 11. Thus, the value of switch $A^3$–1, shown in FIGS. 7 and 9, can be found from the chart of FIG. 11 in the horizontal line representing bit position A and in the vertical column headed by the configuration No. 1 wherein it is indicated that the value of switch $A^3$–1, when actuated, is 1. Switch $B^3$–2 is also shown in FIGS. 7 and 9, and its value is indicated in the chart as 8 in the horizontal line representing bit position B and in the vertical column headed by the configuration No. 2.

To further illustrate the quaternary code tool identification system, reference is made to FIG. 2, wherein the particular drill shown retained in the toolholder is provided with quaternary coding that identifies the tool as No. 93,243. Referring now to the chart of FIG. 10, in the first column under the heading "Tool Number," the No. 93,243 is listed. In the same horizontal line with the No. 93,243 it is indicated that the quaternary code expression for this tool is 0112300323. Relating the quaternary expression 0112300323 to the actual identifier member configurations placed on the toolholder to identify tool No. 93,243, as shown in FIG. 2, it will be seen that identifier members of configurations 0, 1, 1, 2, 3, 0, 0, 3, 2 and 3, have been disposed on the holder in bit positions J to A, inclusive, respectively. Referring now to FIGS. 8 and 9, it will be seen that the identifier member of configuration 3 in bit position A actuates switches $A_3$–1 and $A^3$–2 together; identifier member of configuration 2 in bit position B actuates switch $B^3$–2 but does not actuate switch $B^3$–1; identifier member of configuration 3 in bit position C actuates switches $C^3$–1 and $C^3$–2 together; identifier member of configuration 0 in bit position D will actuate neither switch $D^3$–1 nor switch $D^3$–2; identifier member of configuration 0 in bit position E will actuate neither switch $E^3$–1 nor switch $E^3$–2; identifier member of configuration 3 in bit position F actuates switches $F^3$–1 and $F^3$–2 together; identifier member of configuration 2 in bit position G actuates switch $G^3$–2 but does not actuate switch $G^3$–1; identifier member of configuration 1 in bit position H actuates switch $H^3$–1 but does not actuate switch $H^3$–2; identifier member of configuration 1 in bit position I actuates switch $I^3$–1 but does not actuate switch $I^3$–2; and, identifier member of configuration 0 in bit position J will actuate neither switch $J^3$–1 nor switch $J^3$–2.

Referring to the chart of FIG. 11, the numerical values for each actuated switch can be determined as follows:

| | |
|---|---|
| $A^3$–1 | 1 |
| $A^3$–2 | 2 |
| $B^3$–2 | 8 |
| $C^3$–1 | 16 |
| $C^3$–2 | 32 |
| $F^3$–1 | 1,024 |
| $F^3$–2 | 2,048 |
| $G^3$–2 | 8,192 |
| $H^3$–1 | 16,384 |
| $I^3$–1 | 65,536 |

Summing the numerical values for all actuated switches, the No. 93,243 is obtained, which is the particular desired tool shown retained in the toolholder of FIG. 2.

FIGS. 12 to 21, inclusive, show the relationship between the quaternary tool code, the physical identifier member arrangement, the switches of the selector actuated by the identifier members, the binary code expression and the numerical values obtained for ten different tool numbers selected at random. Thus, referring to FIG. 19, it is seen that for tool No. 263,485, the quaternary tool coding is 1000110331, which is related to the physical identifier member configurations on the toolholder, as shown. From the line containing the binary coding it is apparent these identifier members actuate selector switches $A^3$–1, $B^3$–1 and $B^3$–2 together, $C^3$–1 and $C^3$–2 together, $E^3$–1, $F^3$–1 and $J^3$–1. The binary number for identifying the particular tool is 01000000010100111101. The numerical values for the actuated switches are: $A^3$–1 is 1; $B^3$–1 is 4; $B^3$–2 is 8; $C^3$–1 is 16; $C^3$–2 is 32; $E^3$–1 is 256; $F^3$–1 is 1024; and, $J^3$–1 is 262,144. Summation of the numerical values of the actuated selector switches gives the No. 263,485, which is the tool number.

It is not deemed necessary to describe FIGS. 12 to 18, inclusive, or FIG. 20 and 21, as the explanation given in relationship to FIG. 19 applies to the other exemplary figures.

Instead of numbering all of the tools consecutively from 1 to 1,048,575, as described above, it may be preferable for facilitating tool classification, to divide the tool coding into two groups with the first group identifying a particular tool category and the second group identifying the individual tool within the category. For example, with ten identifier members or bits available on the toolholder for the quaternary coding described, it would be convenient to divide the ten identifier members or bits into two groups of five identifier members or bits each, with the first five identifier members or bits serving to identify the individual tools of a tool classification or category, and the second group of five identifier members or bits functioning to identify the category of the tool.

Thus, bit positions A to E of the toolholder 47 will receive the coding for identifying the individual tools of each category and bit positions F to J will be coded to identify the category of each tool. Five bit positions of quaternary coding, as previously described, can represent 1023 different numerical values. Accordingly, this coding arrangement has the capacity of identifying 1023 different categories of tools and 1023 different tools in each category to provide a tool capacity for identifying 1,046,529 tools. Thus, bit positions A to E on the toolholder 47 will be coded to represent the numerical values from 0 to 1023 inclusive, and this coding will be repeated in bit positions F to J to again represent the numerical values from 0 to 1023.

If the coding is divided into two groups in this manner, the assembly of identifier members 46 on the toolholder 47, in FIG. 2, represents a different tool number. Bit positions A to E, which identify the individual tool in a category, contain identifier members that produce the quaternary code expression 00323, which represents the decimal number of 59. The second group of bit positions F to J identify the tool category, and in FIG. 2, they contain identifier members that produce the quaternary number 01123, which is expressed as number 91 in the decimal system. The tool identified by the coding shown in FIG. 2 is therefore tool number 59 in tool category 91.

Other groupings of the coding can be made to accommodate the situation. For example, identifier members in bit positions A to C may be utilized to identify 63 groups, while the identifier members in bit positions D to F may serve to identify 63 different sub-groups. Then the identifier members in bit positions G to J can function to identify 255 individual tools in each sub-group. With this arrangement, 63 individual groups of 63 different sub-groups, each having 255 individual tools, can be identified to provide a capacity for identifying 1,012,095 individual tools.

By eliminating the identifier member of configuration 3 and employing only the identifier members of configurations 0, 1 and 2, in any bit position on the toolholder, a ternary coding system is obtained providing a capacity for identifying 59,048 individual tools. With identifier member of configuration 3 eliminated, simultaneous actuation of the pair of switches of each group of switches $A^3$ to $J^3$, inclusive, cannot be effected. For example, the switch $A^3$–1 of the group of switches $A^3$ associated with the toolholder bit position A will be actuated by an identifier member of configuration 1; while switch $A^3$–2 of group $A^3$ will be actuated by an identifier member of configuration 2. If bit position A has an identifier member of configuration 0, then neither of the switches $A^3$–1 nor $A^3$–2 will be actuated. Since the identifier member of configuration 3 will not be employed, the switches $A^3$–1 and $A^3$–2 are never actuated together. As a result, each bit space or position will represent one digit of the ternary code, and will have any one of three different values, as represented by the three different identifier member configurations 0, 1, and 2, which any bit space may have. Thus, when an identifier member of configuration 0 is placed in any bit space of the toolholder, that bit position, regardless of which of the ten bit positions or spaces it is, has a value of zero. However, the other two values for each bit space vary from bit space to bit space, depending upon what digit of the ternary code it represents.

On the other hand, each of the switches in the tool selector mechanism 40 is assigned a value in accordance with the binary system, and each switch represents its assigned value when it is actuated or "ON." When the switch is deactivated, or "OFF," it establishes a zero value for the digit which it represents in the binary system. Thus, each switch can represent two values, one of which is zero for every switch and the other value varies for each switch, depending upon which digit of the binary system it represents.

As previously described, the twenty switches of the selector mechanism 40 are divided into ten pairs and each pair cooperates with one of the ten identifier members or bits that form the ternary coding on the toolholder. The three values of each identifier member or bit for the ternary code are established by actuating the two switches that cooperate with that particular identifier member or bit in three different combinations. The first value of every identifier member or bit, as previously mentioned, is zero. The second value of the identifier member or bit in the ternary code corresponds to the value assigned to the first switch in the pair that cooperate with the particular identifier member or bit. The third value of the identifier member or bit in the ternary code corresponds to the value assigned to the second switch of the pair that cooperate with the particular bit.

Accordingly, if zero value is desired for any particular digit of the ternary code, an identifier member 46 of configuration 0 is placed in the bit space associated with that digit, and when the toolholder moves into operating relationship with the selector mechanism 40, neither one of the two switches that cooperate with that identifier member or bit of the ternary code will be actuated, to indicate a zero value for that bit. When the second value of the particular identifier member or bit in the ternary code is desired, an identifier member 46 of configuration 1 is placed in the particular selected bit space and it will actuate the first switch of the pair which corresponds in value to the second value of the associated bit in the ternary code. When the third value of an identifier member in the ternary code is desired, identifier member 46 of configuration 2 is placed in the proper bit space and it will actuate the second switch of the pair which corresponds in value to the third value of that particular bit in the ternary code.

This relationship is best shown in the chart of FIG. 22 wherein the three identifier member configurations 0, 1 and 2 are indicated at the top of three separate vertical columns. The fourth vertical column indicates the toolholder bit positions A to J, inclusive, with each letter being at the end of a horizontal line to identify the horizontal line as a bit position. The first three vertical columns beneath the identifier member configuration headings list the value of the switches with each switch value being listed in the vertical column that is headed by the identifier member configuration which actuates the switch and with each switch value being listed in the horizontal line that identifies the bit position in which the identifier member must be located to actuate the switch that is assigned the listed value.

From the chart of FIG. 22, the value of a switch that is actuated by any of the identifier members 46 in any bit position on the toolholder 47 can be easily ascertained. If an identifier member 46 of configuration 0 is located in any bit position, no switches are actuated by the identifier member in that bit position and its value is zero, as indicated in the first vertical column of the chart. If an identifier member 46 of configuration 1 is located in bit position E on the toolholder 47, the value of the switch that will be actuated by this identifier member can be readily determined. Thus, the second vertical column is headed by the configuration 1 and proceeding down this column, to the horizontal line representing the bit position E, the value 81 is found for the switch that will be actuated by an identifier member of configuration 1 in bit position E. In the same manner, if an identifier member of configuration 2 is located in bit position F on the toolholder 47, the value of the switch that will be actuated by this identifier member is determined from the third vertical column headed by the configuration 2, and proceeding down this column to the horizontal line representing the bit position F, the value 486 is found for the switch that will be actuated by an identifier member of configuration 2 in bit position F.

With each of the switch pairs of the selector mechanism 40 identified by a reference character that includes a character which identifies the bit position with which the switch pairs are associated, the value of any switch may also be conveniently ascertained from the chart of FIG. 22. Thus, the value of the switch $A^3$–1 can be found in the chart in the horizontal line representing bit position A and in the vertical column headed by the configuration 1 wherein it is indicated that the value of switch $A^3$–1, when actuated, is 1. Switch $B^3$–2 is also shown and its value can be ascertained from the chart in the horizontal line representing bit position B and in the vertical column headed by the configuration 2, and as therein indicated, the value of the switch $B^3$–2, when actuated, is 6.

To further illustrate the ternary code tool identification system, reference is made to FIG. 23, where an end mill is shown as the particular tool retained in the toolholder and which is provided with a ternary coding that identifies the end mill as tool No. 10,703. As shown in FIG. 23, it will be seen that identifier members or bits of configurations 2, 0, 1, 0, 0, 2, 2, 1, 1, and 0, have been disposed on the holder in bit positions A to J, inclusive, respectively. Thus, the identifier member of configuration 2 in bit position A will actuate the switch $A^3$–2; the identifier member of configuration 0 in bit position B does not actuate either of the switches $B^3$–1 or $B^3$–2; identifier member of configuration 1 in bit position C will actuate the switch $C^3$–1; identifier member of configuration 0 in bit position D will not actuate either switches $D^3$–1 or $D^3$–2; identifier member of configuration 0 in bit position E will not actuate either of the switches $E^3$–1 or $E^3$–2; identifier member of configuration 2 in bit position F will actuate the switch $F^3$–2; identifier member of configuration 2 in bit position G will actuate the switch $G^3$–2; identifier member of configuration 1 in bit position H will actuate the switch $H^3$–1; identifier member of configuration 1 in bit position I will actuate the switch $I^3$–1; and identifier member of configuration 0 in bit position J will not actuate either of switches $J^3$–1 or $J^3$–2.

Referring to the chart of FIG. 22, the numerical values for each actuated switch can be determined as follows:

| | |
|---|---|
| $A^3$–**2** | 2 |
| $C^3$–**1** | 9 |
| $F^3$–**2** | 486 |
| $G^3$–**2** | 1458 |
| $H^3$–**1** | 2187 |
| $I^3$–**1** | 6561 |

Summing the numerical values for all actuated switches, the No. 10,703 is obtained, which is the particular desired tool retained in the toolholder shown in FIG. 23.

To further illustrate the differences between the quaternary coded system and the ternary coded system, identifier members have been shown in bit positions A to J, inclusive, or a toolholder in FIG. 24 which are coded according to the quaternary system to identify the same identical end mill No. 10,703 which is contained in the toolholder of FIG. 23. As shown in FIG. 24, an identifier member of configuration 3 is disposed in both bit positions A and B. An identifier member of configuration 0 is positioned in bit position C; an identifier member of configuration 3 is positioned in bit position D; while an identifier member of configuration 1 is in bit position E; and, bit positions F and G both have identifier members of configuration 2. Identifier members of configuration 0 are placed in bit positions H, I and J. Thus, from the chart of FIG. 11, there will be seen that an identifier member of configuration 3 in bit position A will have a value of 3; while an identifier member of configuration 3 in bit position B will have a value of 12; an identifier member of configuration 3 in bit position D will have a value of 192; an identifier member of configuration 1 in bit position E will have a value of 256; the identifier members of configuration 2 in bit positions F and G will have the values of 2048 and 8192 respectively; while the identifier members of configuration 0 in bit positions C, H, I and J all have the value of zero. The summation of these values will give the number 10,703 to identify the end mill which is the same number which identifies the end mill shown in FIG. 23, and identified by the ternary coding thereon.

The method for obtaining the ternary code expression for a tool number is similar to that previously described in conjunction with obtaining the quaternary code expression. The ternary code expression for a particular tool number may be ascertained by dividing the decimal number of the desired tool by 3 and the remainder constitutes the first digit of the ternary code. The answer obtained by dividing the original decimal number, but not including the remainder is, in turn, divided by 3 and the remainder obtained from this division is the second digit of the ternary code. The answer obtained from the second division, but not including the remainder, is then divided by 3 and the remainder of the third division is the third digit of the code. The procedure is continued in this manner until all digits of the code are calculated. This information can then be utilized for assembling the identifier members on the cylindrical surface 79 of the toolholder 47 in the proper combination for identifying the desired tool.

For example, assuming that the ternary code expression for tool No. 10,703 is desired, the method for obtaining the code expression is as follows:

3/10,703
3/3,567–2–A
3/1,189–0–B
3/396–1–C
3/132–0–D
3/44–0–E
3/14–2–F
3/4–2–G
3/1–1–H
3/0–1–I
0–0–J

Thus, the ternary code for tool No. 10,703 is 2010022110.

The ternary tool coding may also be divided into two groups with the first group identifying a particular tool category and the second group identifying the individual tool within the category. For example, the ten identifier members or bits available on a toolholder for the ternary coding described can be divided into two groups of five identifier members or bits each, with the first five identifier members or bits serving to identify the individual tools of a tool category and the second group of five identifier members or bits functioning to identify the category of the tool.

Thus, bit positions A to E of the toolholder 47, shown in FIG. 23, will provide the coding for identifying the individual tools of each category, and bit positions F to J will be coded to identify the category of each tool. Five bit positions of ternary coding can represent 242 different numerical values. Accordingly, this coding arrangement has the capacity of identifying 242 different categories of tools and 242 different tools in each category to provide a tool capacity for identifying 58,564 tools. Thus, bit positions A to E on the toolholder 47 of FIG. 23 will be coded to represent the numerical values from 0 to 242 inclusive, and this coding will be repeated in bit positions F to J inclusive, to again represent the numerical values from 0 to 242.

If the ternary coding is divided into two groups in this manner, the assembly of identifier members or 46 on the toolholder 47, shown in FIG. 23, represents a different tool number. Bit positions A to E, which identify the individual tool in a category, contain identifier members that produce the ternary code expression 20,100, which represents the decimal number of 11. The second group of bit positions F to J, identify the tool category and have identifier members that produce the ternary code expression 22,110, which represents the decimal number 44. Thus, the tool shown in FIG. 23 and identified by the coding would be tool No. 11 in tool category 44.

Other groupings of the ternary coding can be made to accommodate for different conditions. For example, identifier members in bit positions A to C may be utilized to identify 26 groups, while the identifier members in bit positions D to F may serve to identify 26 different sub-groups. Then the identifier members in bit positions G to J can function to identify 80 individual tools in each sub-group. With this arrangement, 26 individual groups of 26 different sub-groups, each having 80 individual tools, can be identified to provide a capacity for identifying 54,080 individual tools.

An electrical tool designation circuit that operates in conjunction with the tool selecting mechanism or reading head 40 for effecting automatic selection of a desired tool is illustrated in FIG. 25. In the diagram of FIG. 25, the direct current components obtain power from a direct current power line DC–1 and are connected to ground represented by the line DC–2. The alternating current components are connected across a pair of alternating current power lines AC–1 and AC–2, as illustrated in FIG. 25. Each of the electrical components is shown in the wiring diagram in one of a plurality of conductors or lines that are connected across the power lines with each of these lines being identified successively by the numerals L1 to L32, inclusive, so that the components may be readily located in the diagram. The contacts of the various relays are identified by the same reference character as their associated relay coils with a numerical suffix added for the purpose of distinguishing each individual contact from the others.

The power lines are energized from a source (not shown) in a well-known manner.

To effect movement of the tools contained in the magazine 30 past the selector mechanism 40, a magazine motor 150, shown diagrammatically in line L3 of FIG. 25 is energized to effect the rotation of the magazine for moving the individual tools contained therein past the reading head or selector mechanism 40. Energization of the magazine motor 150 is effected by depressing the button of a manually operated start switch 151 in line L3. With the button of the start switch 151 momentarily depressed, a circuit is established and current will flow from the DC–1 power line along the line L3, through the closed contact of the start switch 151, through the coil of a relay 3CRE, and thence to the magazine motor 150. The current will continue to flow along the line L3 and through a normally closed contact 4CRE–1 of a deenergized motor stop relay 4CRE, the coil of which is shown in line L28, and thence to ground represented by the line DC–2. The relay 3CRE, upon being energized, will operate to close its contact 3CRE–1 in line L4, to establish a holding circuit around the start switch 151 through a conductor 153 and the closed contact 3CRE–1 for maintaining the magazine motor 150 energized upon the release of the button of the start switch 151. With the magazine motor 150 energized, the magazine 30 will be rotated and the tools contained therein moved past the selector mechanism 40 in a continuous rotary path of travel until such time as coincidence is obtained between the designation circuit and the selector circuit. When coincidence is obtained, the magazine motor 150 will be deenergized to stop magazine rotation and the selected desired tool will be located in the tool change station. The designation circuit and selection circuit of the control circuit are illustrated diagrammatically in FIG. 25, for operation with the quaternary tool coding and with the tool identifier members or bits divided into two groups for identifying a particular tool category and the individual tool in the category.

As previously mentioned, the selection of a desired tool is effected automatically from recorded data contained on a record such as magnetic or punched tape 156 which is read by a tape reader 157 shown diagrammatically in FIG. 25. Automatic selection of a tool is effected by the closing of a manually operated selector switch 158 in line L2, to complete a circuit to an automatic relay 1CRA. The energization of this relay will condition the electrical circuit for operation in response to signals received from the record and the closure of its contact 1CRA–1 in line L1, serves to complete a circuit for effecting the operation of the tape reader 157. The tape reader 157 is electrically connected in the circuit and will operate to produce the appropriate electrical signals in response to the information contained on the tape 156 for effecting a tool selection operation automatically.

Energization of the relay 1CRA also operates to effect a closing of another of its contacts 1CRA–2 in line L6, to complete a circuit from the power line DC–1 so that current will flow along the line L5, through the closed contact 1CRA–2 to a vertical conductor 161 to energize the conductor for the subsequent operation of the various components connected thereto.

In a tool selection operation, the initial step is to indicate in the electrical control circuit which one of the tools 35 is to be selected for location at the tool change station 36. It will be recalled that each of the tools 35 is identified by a decimal number and is coded in accordance with the quaternary code system having ten digits. The identifier members or bits of each of the quaternary coded tools are divided into two groups of five identifier members or bits each and are adapted to be moved past the selector mechanism 40 so as to actuate the ten pairs of switches also divided into two groups of five pairs in accordance with the binary code system for identifying the tool category and the individual tools in the category. Since each group of switches is provided with ten switches to represent 1023 different numerical values for each group, a capacity for identifying 1,046,529 tools is provided. The binary number of the desired tool may be impressed upon the electrical control system automatically in response to signals from recorded data.

Automatic indication of the desired tool to be selected for location at the tool change station is accomplished through operation of a plurality of normally open contacts 171 to 190, inclusive, which contacts are closed in response to signals from the record, such as electrical signals produced by the tape reader 157 from the tape 156. Automatic contacts 171 to 180, inclusive, will be closed in response to a signal from the record, the contacts being closed either singly or in any combination, to indicate the desired tool of a particular tool cateogry. The contact 171 represents the first digit of the tool binary number and each succeeding contact represents a succeeding digit, with the contact 180 representing the tenth digit. Automatic contacts 181 to 190, inclusive, will also be closed in response to a signal from the record, either singly or in any combination, to indicate the category of the particular desired tool. The contact 181 represents the first digit of the tool category binary number and each succeeding contact represents a succeeding digit, with the contact 190 representing the tenth digit. These contacts, 171 to 180 and 181 to 190, inclusive, will be closed in response to signals from the record, to indicate the tool category number and the number of the desired tool within the category, in the electrical control system.

With the selector swtich 158 in the "ON" position, as previously described, the automatic tape control relay 1CRA is energized so that its contact 1CRA–2 in line L6 is closed, thereby completing a circuit to the vertical conductor 161 to energize it so that any of the component relays which are connected to it may be energized in response to the closing of any of the contacts 171 to 190, inclusive, by the operation of the tape reader 157. The automatic contacts 171 to 180, inclusive, operate to complete circuits for selectively energizing a plurality of relays A1–CRE, A2–CRE, B1–CRE, B2–CRE, C1–CRE, C2–CRE, D1–CRE, D2–CRE, E1–CRE, E2–CRE, respectively; while the automatic contacts 181 to 190, inclusive, operate to complete circuits for selectively energizing a plurality of relays F1–CRE, F2–CRE, G1–CRE, G2–CRE, H1–CRE, H2–CRE, I1–CRE, I2–CRE, J1–CRE and J2–CRE, respectively. Thus, if tool No. 1 in tool category No. 1 is desired to be selected for location at the tool change station 36, the automatic contact 171 will be closed to indicate the numeral 1 for the first digit of the tool binary number and automatic contact 181 will be closed to indicate the numeral 1 for the first digit of the tool category binary number. A circuit will therefore be completed from the energized vertical conductor 161 through the closed contact 181, the coil of relay F1–CRE, line L17, and thence to ground represented by the line DC–2. Energization of the relay F1–CRE will represent the numeral 1 in the first digit of the tool category binary number. The remaining associated contacts 182 to 190, inclusive, will remain open and their associated relays F2–CRE to J2–CRE, inclusive, will be maintained deenergized. Thus, the tool category binary number indicated will be 0000000001. A circuit will also be completed from the energized vertical conductor 161 through the closed contact 171, the coil of the relay A1–CRE and thence to ground represented by the line DC–2 to energize this relay. Energization of the relay A1–CRE will represent the numeral 1 in the first digit of the binary number that identifies the tool in the selected category. With the remaining automatic contacts 172 to 180, inclusive, in their open position, the remaining relays A2–CRE to E2–CRE, inclusive, will be maintained deenergized. Thus, with only the relay A1–CRE energized, the tool binary number indicated will be 0000000001 and tool No. 1 will be indicated as the specified tool of tool category No. 1 to be selected for location in the tool change station 36.

It will be recalled that the reading head or selector 40 was previously described as having ten movable fingers, $A^2$ to $J^2$, inclusive, which engaged the quaternary coding on the tools as they moved in their circular path of travel past the selector. It will also be recalled, that each of the fingers is connected to operate the individual switches of a pair of switches whenever it is shifted by an identifier member 46. The twenty individual switches of the selector mechanism 40 are shown diagrammatically in FIG. 25, and as previously mentioned, are divided into two groups of ten switches each, with the switch $A^3$–1 representing the first digit of the tool identifying binary number, switch $A^3$–2 representing the second digit of the tool binary number, and swtiches $E^3$–1 and $E^3$–2 representing the ninth and tenth digits respectively of the tool binary number. In like manner, the switch $F^3$–1 represents the first digit of the tool cateogry binary number, switch $F^3$–2 represents the second digit of the tool category binary number, and switches $J^3$–1 and $J^3$–2 represent the ninth and tenth digits respectively of the tool category binary number.

Each of the switches $A^3$–1 to $J^3$–2, inclusive, operate in conjunction with a normally open contact and a normally closed contact of one of the twenty relays A1–CRE to J2–CRE, inclusive, with each switch functioning with the contacts of the relay which represents the same digit of the binary number that the switch does. Thus, switch $A^3$–1, line L28, operates in conjunction with the normally open contact A1–CRE–2, line L27, and a normally closed contact A1–CRE–1, line L29, both of which are actuated by energization of the relay A1–CRE in line L7. Likewise, the switch $A^3$–2, line L28, operates in conjunction with two contacts of the relay A2–CRE, line L8, one being a normally open contact A2–CRE–2, line L27, while the other is a normally closed contact A2–CRE–1, line L29. In like manner, the switch $B^3$–1 operates in conjunction with the contacts B1–CRE–2 and B1–CRE–1 of the relay B1–CRE, while the switch $B^3$–2 operates in cooperation with the contacts B2–CRE–2 and B2–CRE–1 of the relay B2–CRE. In a similar manner, the other switches $C^3$–1 to $J^3$–2 cooperates with the contacts of their corresponding relays C1–CRE to J2–CRE respectively, as clearly shown in lines L27 to L32 inclusive in FIG. 25. The operation of the switches $A^3$–1 to $J^3$–2, inclusive, in combination with the operation of the relays A1–CRE to J2–CRE, inclusive, will indicate in the electrical control circuit when the desired tool is located at the tool change station 36.

In the present example, it has been assumed that tool No. 1 in catgeory No. 1 is desired and therefore only relays A1–CRE and F1–CRE have been energized. As a result, the normally open contact F1–CRE–2, line L30, is closed and the normally closed contact F1–CRE–1, line L32, is open. Since the contact F1–CRE–1 has been opened, a circuit cannot be completed to a relay 2CRE, the coil of which appears in line L31, which, when energized, indicates that the desired tool category has been selected. Therefore, with the relay 2CRE deenergized, its normally open contact 2CRE–1, line L28, is open and a circuit cannot be completed to the coil of a relay 4CRE, which, when energized indicates that the particular desired tool of the selected category is positioned in the tool change station 36.

However, when a tool having identifier members in bit positions A and F that are of configuration 1 and the remaining identifier members in bit positions B to E, inclusive, and G to J, inclusive, are of configuration 0, arrives at the tool change station 36, the finger $A^2$ will be actuated to a leftward position, as viewed in FIG. 7, thereby actuating its associating switch $A^3$–1, which represents the first digit of the tool binary number. The finger $F^2$ will also be actuated to a leftward position by an identifier member of configuration 1 in bit position F, thereby actuating its associated switch $F^3$–1, which represents the first digit of the tool category binary number. Actuation of the switch $F^3$–1 will move its cooperating contact bar 191, line L31, out of engagement with the contact 192 and into engagement with a contact 193. When this occurs, coincidence is obtained and a circuit will be completed to the coil of the relay 2CRE and current will flow from the energized power line DC–1 through the contact bar 191, the closed contact F1–CRE–2, the contact bar 194 of the switch $F^3$–2, and thence through the contact bars of the other tool category switches, all in line L31, and their associated normally closed relay contacts shown in line L32, to the conductor of line L31, to energize the coil of the relay 2CRE. Energization of the relay 2CRE will operate to close its normally open contact 2CRE–1 in line L28. With the tool category selection circuit completed and the relay 2CRE energized, and the switch $A^3$–1 actuated by the identifier member of configuration 1 in bit position A, the switch contact bar 196, line L28, is moved out of engagement with the contact 197 and into engagement with a contact 198. Under these conditions, coincidence is obtained and a circuit will be completed to energize the coil of a relay 4CRE, line L28. The current will flow from the power line DC–1 through the contact bar 196, the now closed contact A1–CRE–2, line L27, of the energized relay A1–CRE, the contact bar 199 of the switch $A^3$–2, and thence through the contact bars of the other tool number switches, in line L28, and their associated normally closed relay contacts in line L29, to the coil of the relay 4CRE and thence through the closed contact 2CRE–1 to ground, as represented by the line DC–2. The relay 4CRE, upon being energized, will operate to open its normally closed contact bar 4CRE–1, in line L3, to interrupt the circuit along line L3 to deenergize the magazine motor 150, thereby stopping magazine rotation with the desired No. 1 tool of category No. 1 located in the tool change station 36.

Assuming now that the signals produced by the tape reader 157 from the tape 156 are such as to designate tool No. 59 of category No. 91 as the next tool designated for selection and location at the tool change station 36. The automatic contacts 171 and 181 will immediately be opened thereby effecting deenergization of the relays A1–CRE and F1–CRE, causing them to move their associated contacts to their normal positions. When this occurs, the circuit for energizing the coil of the relay 2CRE, line L31, is interrupted thereby deenergizing the relay which thereupon operates to effect the return of its contact 2CRE–1 in line L28 to its normal open position. As a result, the relay 4CRE is deenergized so that its contact 4CRE–1, in line L3, is returned to its normally closed position to condition the circuit for a subsequent energization of the magazine motor 150.

Now, the signal produced by the tape reader 157 from the tape 156 and designating tool No. 91–59, represented by the category binary number 0001011011 and by the tool binary number 0000111011, will effect the closing of the automatic tool category contacts 181, 182, 184, 185 and 187 to designate the tool categoary as No. 91, and the closing of the automatic tool number contacts 171, 172, 174, 175 and 176 designating tool No. 59 in the specified category. With the automatic tool category designation contacts 181, 182, 184, 185 and 187 closed, their associated relays F1–CRE, F2–CRE, G2–CRE, H1–CRE and I1–CRE are energized. Energization of relay F1–CRE operates to close its normally open contact F1–CRE–2, line L30, and open its normally closed contact F1–CRE–1, line L32, while the energized relay F2–CRE operates to close its contact F2–CRE–2 and open its contact F2–CRE–1. Similarly, energized relay G2–CRE operates to close its contact G2–CRE–2 and open its contact G2–CRE–1; energized relay H1–CRE operates to close its contact H1–CRE–2 and open its contact H1–CRE–1; while energized relay I1–CRE operates to close its normally open contact I1–CRE–2, line L30, and open its normally closed contact I1–CRE–1 in line L32. Also, with the automatic tool designation, contacts 171, 172, 174, 175 and 176 closed, their associated relays A1–CRE, A2–CRE, B2–CRE, C1–CRE and C2–CRE are energized. With these relays energized, their associated normally open contacts A1–CRE–2, A2–CRE–2, B2–CRE–2, C1–CRE–2 and C2–CRE–2, respectively, in line L27, are closed, while their associated normally closed contacts A1–CRE–1, A2–CRE–1, B2–CRE–1, C1–CRE–1 and C2–CRE–1, respectively, in line L29, are opened. However, even though the relays which are associated with the automatic contacts which represent the particular digits of the binary number of the desired tool No. 91–59 are energized, coincidence between the automatic designation contacts and the selector switches is not obtained and a circuit cannot be completed to the relay 2CRE because tool No. 91–59, which is the designated desired tool, is not in the tool change station. The previous tool No. 1–1 is still located therein thereby maintaining the switches $E^3$–1 and $A^3$–1 actuated. Thus, the contact bar 191, line L31, of switch $F^3$–1 is maintained in engagement with the contact 193, but the switches $F^3$–2 to $J^3$–2, inclusive, are not actuated so that their contact bars, line L31, are in their normal positions in engagement with contacts 201 to 209, inclusive, respectively. Similarly, the contact bar 196, line L28, of switch $A^3$–1 is maintained in engagement with the contact 198, but the switches $A^3$–2 to $E^3$–2, inclusive, are not actuated so that their contact bars, in line L28, are in their normal positions in engagement with contacts 211 to 219, inclusive, respectively.

Accordingly, coincidence does not exist between the contacts of the relays A1–CRE to J2–CRE and their associated switches in lines L27 to L32 so that a circuit is not completed to the coil of relay 2CRE. With the relay 2CRE deenergized its contact 2CRE–1, in line L28, is in open position so that the coil of the relay 4CRE cannot be energized. With the relay 4CRE deenergized, its contact 4CRE–1, line L3, is in its normally closed position to condition the magazine motor circuit for the subsequent tool selection operation of the motor.

With tool No. 91–59, represented by the tool category binary number 0001011011 and the individual tool binary number 0000111011, impressed on the designation circuit as the next desired tool to be selected by the selective actuation of the switches 171 to 190, the button of the manual start switch 151, line L3, is depressed to energize the magazine motor 150 to drive the magazine 30 in its rotational movement. When the tool No. 91–59 carried in the magazine is moved to the tool change station 36, the identifier members of configurations 3, 2, 1 and 1 in bit positions F, G, H and I, respectively, will cause switches $F^3$–1, $F^3$–2, $G^3$–2, $H^3$–1 and $I^3$–1 to be actuated. These switches represent the first, second, fourth, fifth and seventh digits, respectively, of the tool category binary number 0001011011, which represents tool category No. 91.

Thus, with the relays F1–CRE, F2–CRE, G2–CRE, H1–CRE and I1–CRE previously energized, and wtih switches $F^3$–1, $F^3$–2, $G^3$–2, $H^3$–1 and $I^3$–1 actuated, coincidence is obtained and a circuit is completed to energize the coil of relay 2CRE. With the relay 2CRE energized, it operates to move its contact 2CRE–1, line L28, to closed position to indicate that the correct tool category selection has been completed.

Closing of contact 2CRE–1, line L28, completes the tool selection circuit because the identifier members in bit positions A, B and C are of configurations 3, 2 and 3 respectively, and cause switches $A^3$–1, $A^3$–2, $B^3$–2, $C^3$–1 and $C^3$–2 to be actuated, as previously described. With the relays A1–CRE, A2–CRE, B2–CRE, C1–CRE and C2–CRE having been previously energized, and with switches $A^3$–1, $A^3$–2, $B^3$–2, $C^3$–1 and $C^3$–2 actuated, coincidence is obtained in this circuit and the stop relay 4CRE is energized. With relay 4CRE energized, it will operate to move its contact 4CRE–1, line L3, to open position to break the circuit to the magazine motor 150 and rotation of the magazine 30 will stop with the desired tool No. 91–59 in the tool change station 36.

The electrical control circuit illustrated as FIG. 25 is, as previously mentioned, adapted to operate in conjunction with tool coding in which the identifier members or bits are divided into two groups to identify tool category and the individual tools in the category. However, if the tool numbers are to be identified successively, the selector switches $A^3$–1 to $J^3$–2, in lines L28 and L31, would be connected in series. With this arrangement, the category indicating relay 2CRE, in line L31, as well as its associated contact 2CRE-1, in line L28, would be unnecessary and would be eliminated. Also, the coil of the relay 4CRE, shown in line L28 of FIG. 25, would be placed in line L31, so that it would be energized only after coincidence is obtained between the automatic designation contacts and the series connected selection switches.

From the foregoing explanation of the arrangement and operation of the preferred embodiment of the invention, it is apparent that there has been provided an improved system for identifying the individual tool of a large number of tools of different types and sizes.

Although particular structure has been shown and described in considerable detail as exemplary of the manner in which the invention may be practiced, it will be apparent to those skilled in the art to which this invention relates that various modifications of the structures herein shown may be effected without departing from the spirit and scope of the invention as defined in the subjoined claims.

The principle of the invention having now been fully explained in connection with the foregoing description of embodying structure, I hereby claim as my invention:

1. In a tool selection mechanism for selecting a desired tool from a group of tools;
 a tool storage member carrying the group of tools and being movably supported for moving the tools through a tool select station;
 a source of power connected to drive said storage member in its path of travel;
 a plurality of designation elements each having means actuatable in different combinations in accordance with a first numbering system to designate the number of the tool to be located at the tool select station;
 a plurality of electrical control elements actuatable in different combinations in accordance with said first numbering system, said designation and control elements being connected to regulate said source of power to terminate the movement of said storage member when said control elements are actuated in the combination that coincides with the combination of actuated designation elements;
 and actuating means mounted on each of the tools in code fashion in accordance with a second numbering system to actuate said control elements as the tools move past said control elements to terminate the movement of said storage member when the desired tool arrives in said tool selected station.

2. In a tool selection mechanism for selecting a desired tool from a group of tools;
 a plurality of pairs of switches;
 means for moving the tools past said switches;
 and a plurality of identifier members of different configurations secured on the tools in a quaternary coding wherein each identifier member represents one digit of the quaternary code, said identifier members being operable to actuate the individual switches of an associated pair of switches in binary code fashion to cooperate with the other pairs of switches for identifying the tool as the tools move past said switches.

3. In a tool selection mechanism for selecting a desired tool from a group of tools;
 a selector comprising a plurality of pairs of switches; means for moving the tools past said selector;
 and a plurality of identifier members of different sizes and different configurations secured on the tools in selected combinations, each of said identifiers being disposed to actuate the switches of an associated pair of switches in binary code fashion to cooperate with the other pairs of switches to identify the tools as they pass by said selector.

4. In a tool selection mechanism for selecting a desired tool from a group of tools;

a selector comprising a plurality of pairs of switches;
 means for moving the tools past said selector;
 and an identifier member for each pair of switches, said identifier members being of different sizes and different configurations secured on the tools in a quaternary coding, each of said identifier members being operable to actuate the individual switches of an associated pair of switches in binary code fashion to cooperate with the switches of the other pairs of switches for identifying the tool.

5. In a tool selection mechanism for selecting a desired tool from a group of tools;
 a plurality of bit spaces on each of said tools;
 identifier elements respectively having a selected one of three different configurations and being insertable individually in each of said bit spaces;
 and a group of circuit interrupters for each of said bit spaces, the several circuit interrupters of each of said groups being adapted to be actuated by the identifier element in their associated bit space in a selected combination to cooperate with the other groups of circuit interrupters for identifying the tool.

6. In a tool selection mechanism for selecting a desired tool from a group of tools;
 a plurality of switches;
 means for moving the tools past said switches;
 and actuating means on the tools arranged in a quaternary coding for actuating said switches in binary code fashion to identify the tools as they pass by said switches.

7. In a device for identifying tools for automatic selection by a tool selector;
 a plurality of coded identifier members of different sizes and different configurations associated with the tool to cooperate with the selector and constituting coded identification by means of which the selector automatically identifies the tool.

8. In structure for identifying a tool;
 coding means comprising a plurality of identifier members selected from a group of three different configurations associated with the tool in a ternary code fashion for identifying the tool, and means for fixedly securing said coding means to said tool.

9. Tool means including identifier guide means;
 a plurality of individual identifiers of at least three different configurations and with each different identifier configuration arranged on said guide means in predetermined spaced relationship corresponding to a predetermined different coded value;
 and clamp means removably affixed to said guide means for fixedly retaining a predetermined plurality of said identifiers clamped thereto in such a manner that the coded identity of said tool means may be varied both according to the configuration of the respective individual identifiers comprising the plurality of identifiers clamped to said guide means and to the spaced relationship of the individual identfiers to one another and to said clamp means.

10. Tool identification means comprising a plurality of identifiers respectively having one of at least three different configurations and with each differently configured identifier having a different coded value;
 tool means provided with a predetermined selected combination of said identifiers;
 and means for fixedly securing said selected combination of said identifiers to said tool means for providing a unitary structure having a predetermined coded value.

References Cited by the Examiner

UNITED STATES PATENTS 3,052,011 9/62 Brainard et al. ---------- 29—26

CLAUDE A. LE ROY, *Primary Examiner.*